(12) United States Patent
Tsao

(10) Patent No.: US 10,326,770 B2
(45) Date of Patent: Jun. 18, 2019

(54) METHOD AND APPARATUS FOR CONTROLLING ACCESS POOLS OF COMPUTING SYSTEMS IN A WEB BASED ENVIRONMENT

(71) Applicant: Sheng Tai (Ted) Tsao, Fremont, CA (US)

(72) Inventor: Sheng Tai Tsao, Fremont, CA (US)

(73) Assignee: STT WebOS, Inc., Fremont, CA (US)

( * ) Notice: Subject to any disclaimer, the term of this patent is extended or adjusted under 35 U.S.C. 154(b) by 376 days.

(21) Appl. No.: 15/156,260

(22) Filed: May 16, 2016

(65) Prior Publication Data

US 2016/0277415 A1 Sep. 22, 2016

Related U.S. Application Data

(60) Continuation of application No. 14/021,062, filed on Sep. 9, 2013, now Pat. No. 9,448,697, which is a
(Continued)

(51) Int. Cl.
*G06F 15/16* (2006.01)
*H04L 29/06* (2006.01)
(Continued)

(52) U.S. Cl.
CPC ........ *H04L 63/102* (2013.01); *G06F 9/45558* (2013.01); *H04L 41/0806* (2013.01); *H04L 41/0879* (2013.01); *H04L 41/5054* (2013.01); *H04L 63/0815* (2013.01); *H04L 67/02* (2013.01); *H04L 67/22* (2013.01);
(Continued)

(58) Field of Classification Search
CPC ....... G06F 2009/45595; G06F 9/45558; H04L 41/0253; H04L 41/0806; H04L 41/5054; H04L 63/102; H04L 67/02; H04L 67/22
See application file for complete search history.

(56) References Cited

U.S. PATENT DOCUMENTS

| 4,604,694 A | 8/1986 | Hough |
| 5,911,143 A * | 6/1999 | Deinhart ............... G06F 21/604 |

(Continued)

FOREIGN PATENT DOCUMENTS

CN 1744557 A 3/2006

OTHER PUBLICATIONS

Qu at al. "Implementation of an Enterprise Level Groupware System J2EE Platform and WebDev Protocol", IEEE, 2000, pp. 160-169.

*Primary Examiner* — Mohamed Wasel

(57) ABSTRACT

Exchange or sharing information through the World Wide Web is a way of life in modern society. The innovated dynamic workspace technology of this invention together with the implementation of posting and un-posting operations for control sharing or stop sharing various resources of message, files, and folder, networks and storages in a central controlled distributed scalable virtual machine (CCDSVM) has not only greatly improved the sharing for messages, files and folders, but also improved the sharing for enterprise operation. Specially, the use of the dynamic workspace for controlling instantly sharing or stop sharing groups of computing systems of a network has tremendously improves agility, security, and flexibly for enterprise IT operations.

18 Claims, 18 Drawing Sheets

A Typical CCDSVM platform with Multiple Clients

Related U.S. Application Data continuation of application No. 13/080,007, filed on Apr. 5, 2011, now Pat. No. 8,713,442, which is a division of application No. 11/732,496, filed on Apr. 2, 2007, now abandoned, which is a continuation-in-part of application No. 10/713,905, filed on Aug. 12, 2002, now Pat. No. 7,379,990, said application No. 11/732,496 is a continuation-in-part of application No. 10/713,904, filed on Aug. 6, 2002, now Pat. No. 7,418,702.

(60) Provisional application No. 60/787,653, filed on Mar. 31, 2006, provisional application No. 60/402,626, filed on Aug. 12, 2002, provisional application No. 60/401,238, filed on Aug. 6, 2008.

(51) Int. Cl.
*H04L 12/24* (2006.01)
*G06F 9/455* (2018.01)
*H04L 29/08* (2006.01)

(52) U.S. Cl.
CPC ..... *G06F 2009/45595* (2013.01); *H04L 41/0253* (2013.01); *H04L 41/22* (2013.01)

(56) References Cited

U.S. PATENT DOCUMENTS

| | | | |
|---|---|---|---|
| 6,035,404 A | 3/2000 | Zhao | |
| 6,061,795 A * | 5/2000 | Dircks | G06F 21/604 709/217 |
| 6,154,764 A | 11/2000 | Nitta et al. | |
| 6,279,111 B1 * | 8/2001 | Jensenworth | G06F 21/335 713/159 |
| 6,317,777 B1 | 11/2001 | Skarbo et al. | |
| 6,321,308 B1 | 11/2001 | Arnon et al. | |
| 6,489,980 B1 | 12/2002 | Scott et al. | |
| 6,571,245 B2 | 5/2003 | Huang | |
| 7,010,600 B1 * | 3/2006 | Prasad | H04L 63/0815 709/223 |
| 7,124,203 B2 * | 10/2006 | Joshi | G06F 21/62 709/248 |
| 7,185,364 B2 * | 2/2007 | Knouse | H04L 63/0815 709/225 |
| 7,194,764 B2 * | 3/2007 | Martherus | G06F 21/41 726/3 |
| 7,225,256 B2 * | 5/2007 | Villavicencio | H04L 63/08 707/999.1 |
| 7,231,661 B1 * | 6/2007 | Villavicencio | G06F 21/41 709/225 |
| 7,353,252 B1 | 4/2008 | Yang et al. | |
| 7,464,162 B2 * | 12/2008 | Chan | G06F 21/604 709/225 |
| 7,512,965 B1 * | 3/2009 | Amdur | H04L 63/20 726/1 |
| 2002/0112083 A1 * | 8/2002 | Joshi | G06F 21/62 709/248 |
| 2002/0118808 A1 | 8/2002 | Kelleher et al. | |
| 2002/0120599 A1 * | 8/2002 | Knouse | G06F 21/62 |
| 2002/0129106 A1 | 9/2002 | Gutfreund | |
| 2002/0152305 A1 | 10/2002 | Jackson et al. | |
| 2003/0097410 A1 | 5/2003 | Atkins et al. | |
| 2003/0115268 A1 | 6/2003 | Esposito | |
| 2003/0131051 A1 | 7/2003 | Lection et al. | |
| 2003/0149696 A1 * | 8/2003 | Nelson | G06Q 30/06 |
| 2003/0182422 A1 | 9/2003 | Bradshaw et al. | |
| 2003/0233541 A1 * | 12/2003 | Fowler | H04L 9/3265 713/155 |
| 2003/0236820 A1 | 12/2003 | Tiernet et al. | |
| 2004/0044648 A1 | 5/2004 | Anfindsen et al. | |
| 2004/0111612 A1 * | 6/2004 | Choi | H04L 63/0421 713/163 |
| 2005/0091595 A1 | 4/2005 | Shappell et al. | |
| 2005/0097440 A1 | 5/2005 | Lusk et al. | |
| 2005/0262006 A1 | 11/2005 | Beartusk et al. | |
| 2006/0095514 A1 | 5/2006 | Wang et al. | |
| 2006/0242581 A1 | 10/2006 | Manion et al. | |
| 2007/0083592 A1 | 4/2007 | Bartram et al. | |
| 2007/0255712 A1 | 11/2007 | Mahoney et al. | |
| 2008/0091761 A1 | 4/2008 | Tsao | |
| 2009/0138808 A1 | 5/2009 | Moromisato et al. | |
| 2011/0119353 A1 | 5/2011 | Tsao | |
| 2011/0119594 A1 | 5/2011 | Tsao | |
| 2012/0079389 A1 | 3/2012 | Tsao | |
| 2012/0084658 A1 | 4/2012 | Tsao | |
| 2012/0221957 A1 | 8/2012 | Tsao | |
| 2012/0226746 A1 | 9/2012 | Tsao | |
| 2013/0124546 A1 * | 5/2013 | Wormley | G06F 16/27 707/758 |
| 2013/0124690 A1 | 5/2013 | Liebman | |
| 2013/0132853 A1 | 5/2013 | Tsao | |
| 2013/0232252 A1 * | 9/2013 | Huang | G06F 9/45558 709/224 |
| 2014/0040752 A1 | 2/2014 | Tsao | |
| 2015/0095799 A1 | 4/2015 | Tsao | |

* cited by examiner

Fig. 1: A Typical CCDSVM platform with Multiple Clients

Fig. 2A: An example of a variation of the CCDSVM platform for web-browser based communication:
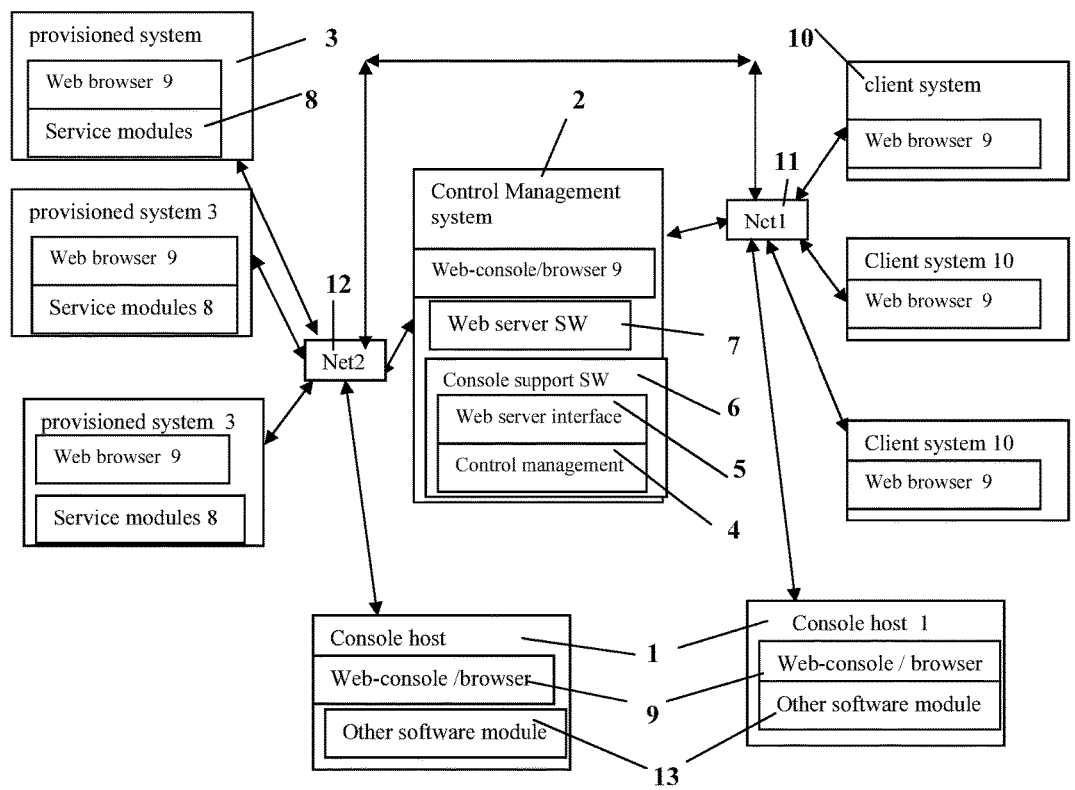

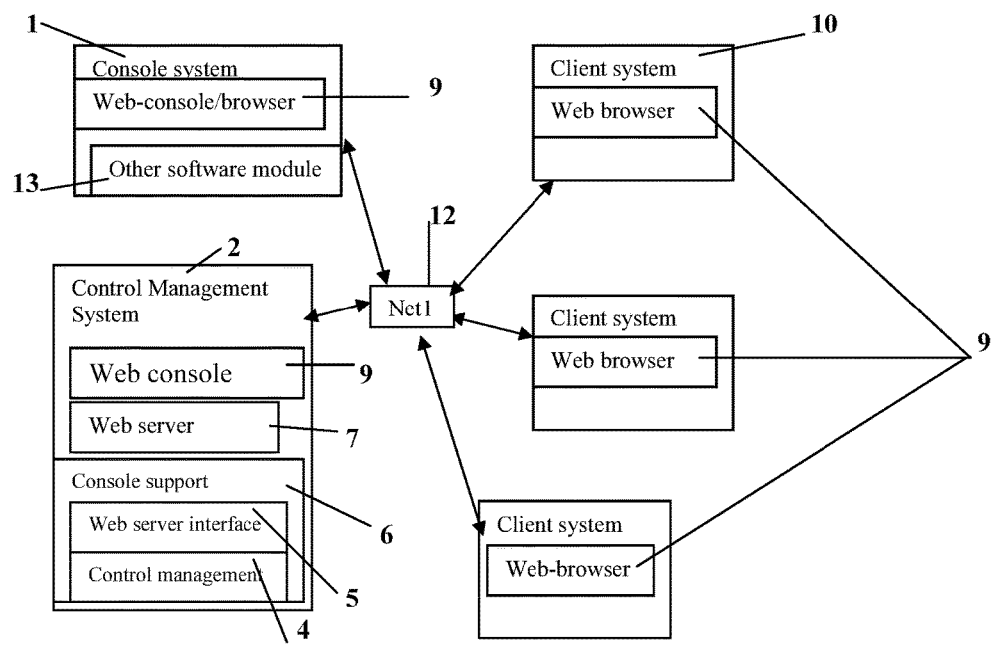
Fig. 2B: A variation of the CCSDVM platform, which is a degenerated CCDSVM with only one control system to be accessed by client systems.

Fig. 3: The Software of a WCUWE for a typical CCDSVM:
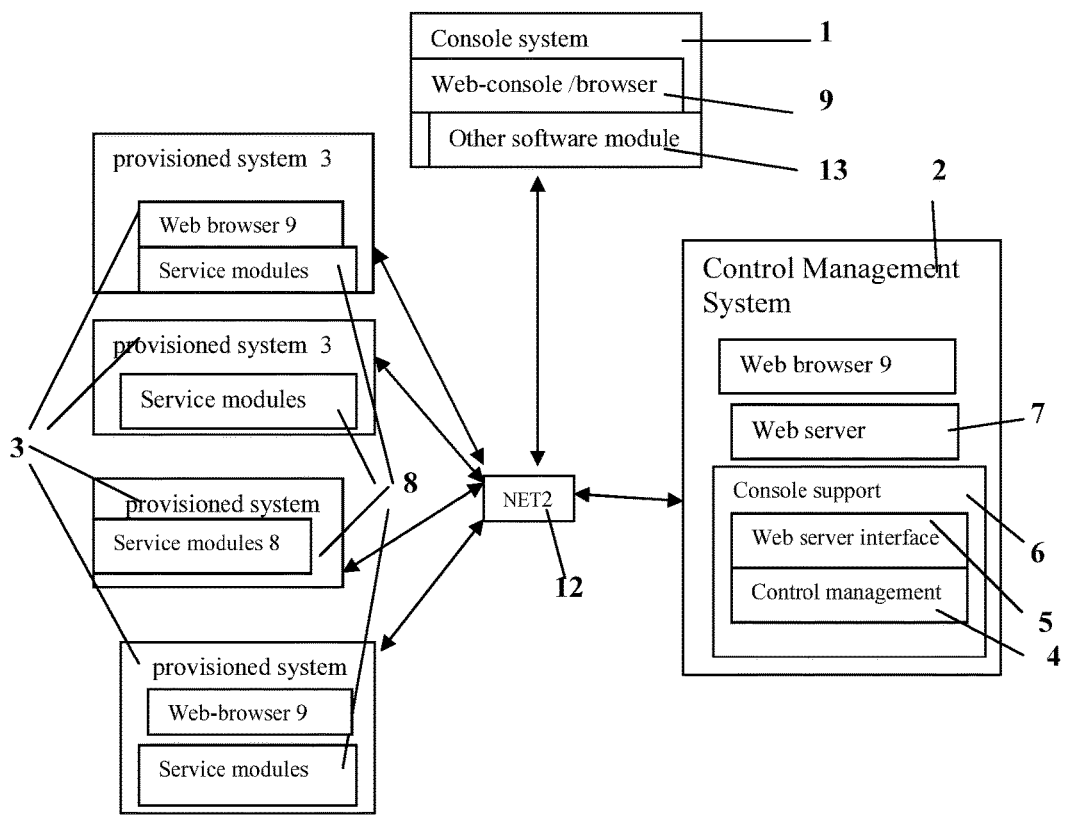

Fig. 4A: Dynamic work space controlled by a control system.

Fig. 4B: an example of resources which may be assigned to a group common work space.
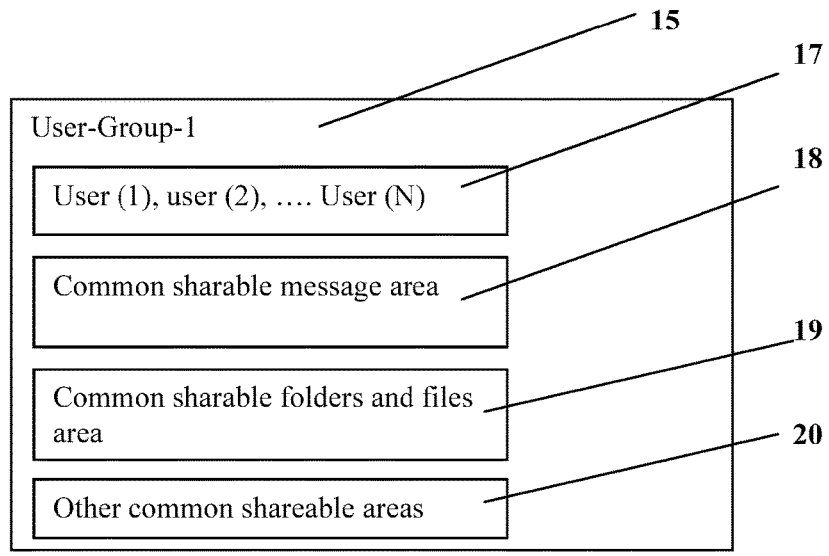
Fig. 4C: an example of resources which may be assigned in a user private work space.
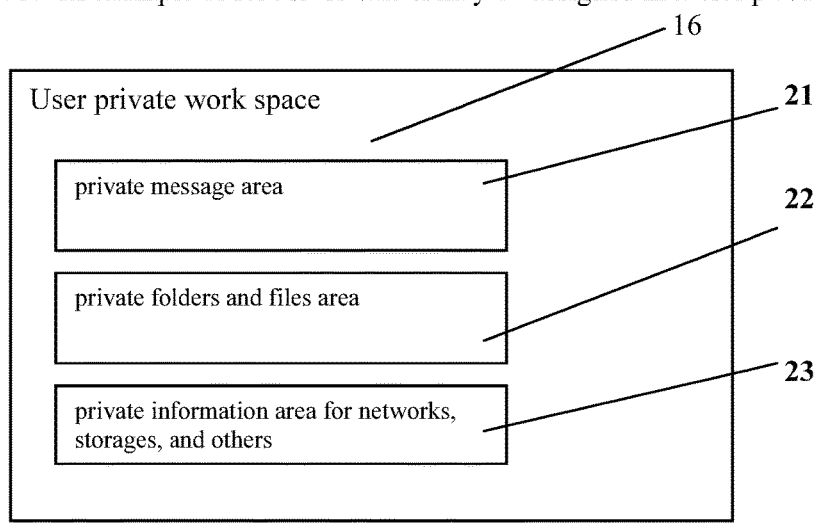

Fig. 5: An example of resources in a CCDSVM, which may be assigned to each group or to each private work space.
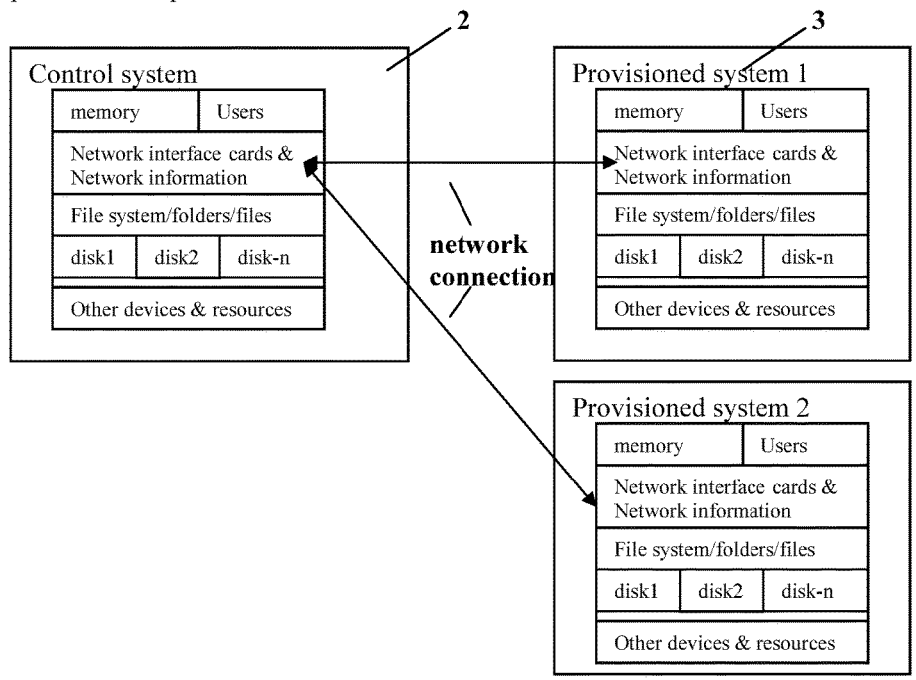

Fig. 6A: An example of displaying a web-page with 4 sections in a web-browser of a user X in a user-group-1 during an interactive online meeting.
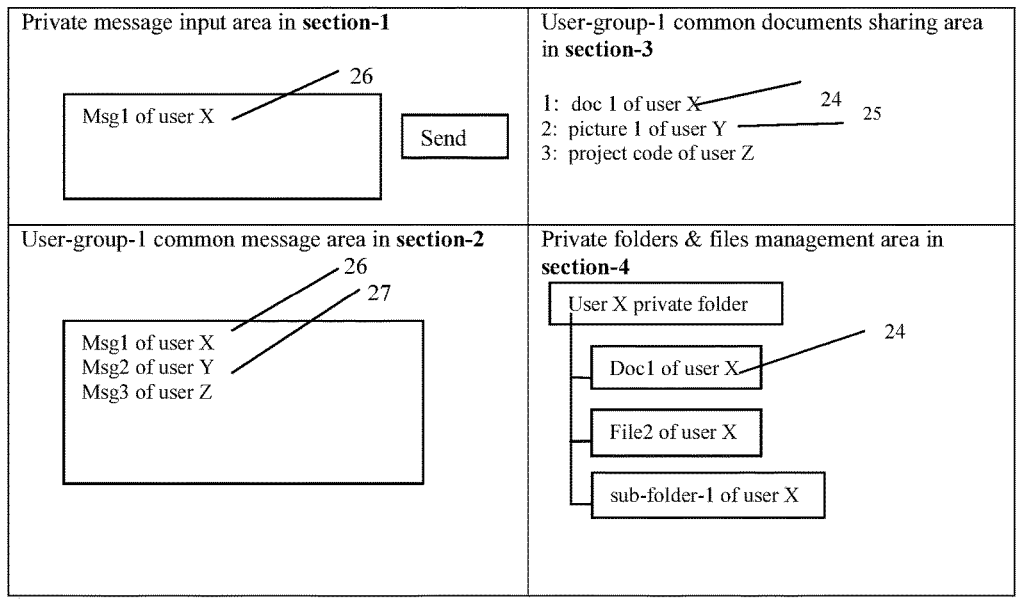

Fig. 6B: An example of displaying a web-page with 4 sections in a web-browser of a user Y of the user-group-1 during the interactive online meeting.
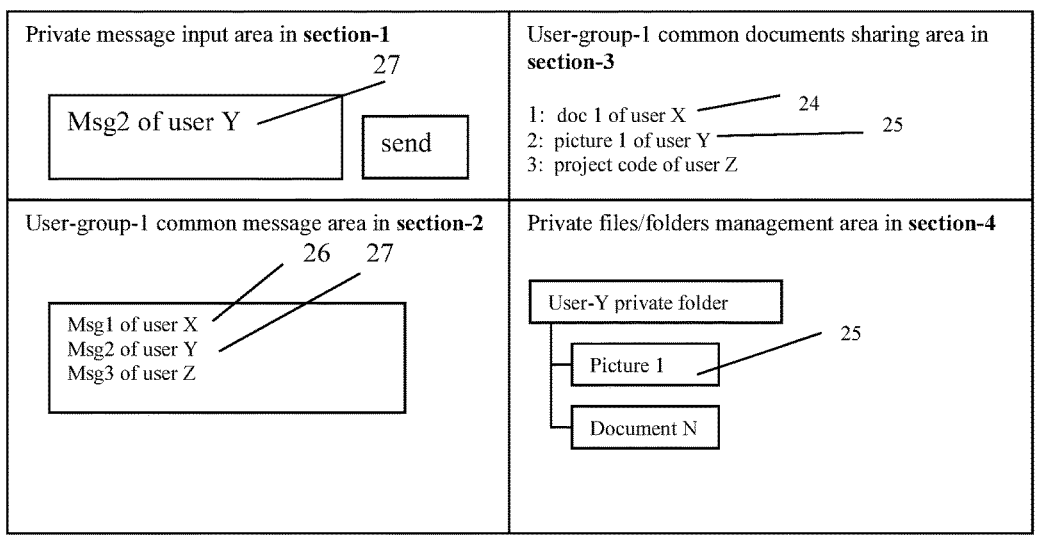

Fig. 6C: An example of displaying a web-page with 4 sections in the browser of the user X of the user group-1 before the interactive online meeting.
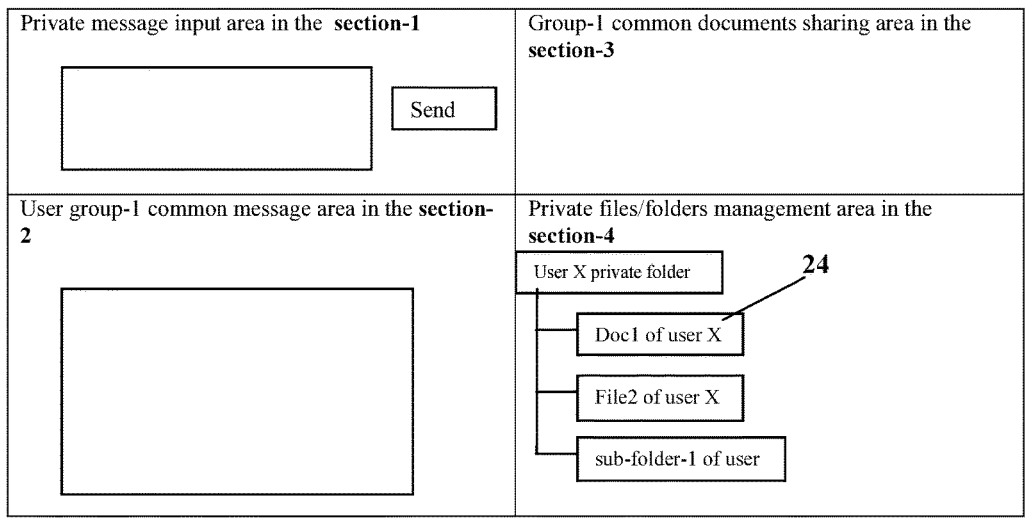
Fig. 6D: An example of displaying a web-page with 4 sections in the browser of the user Y of the user group-1 before the interactive online meeting.
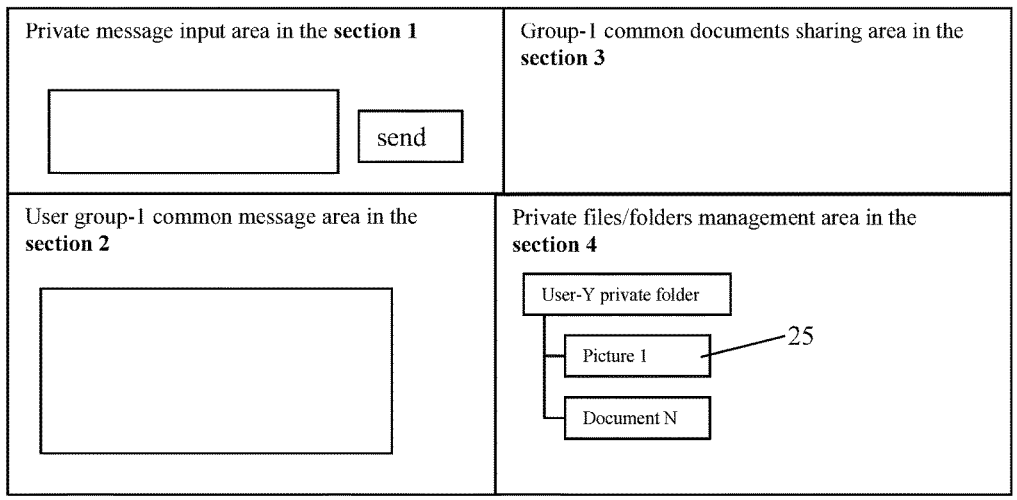

Fig. 6E: An example of a displayed web-page, generated from the user group-1 online meeting of the user X and user Y, for each of a plurality of online users access without joining the user group-1 online meeting.
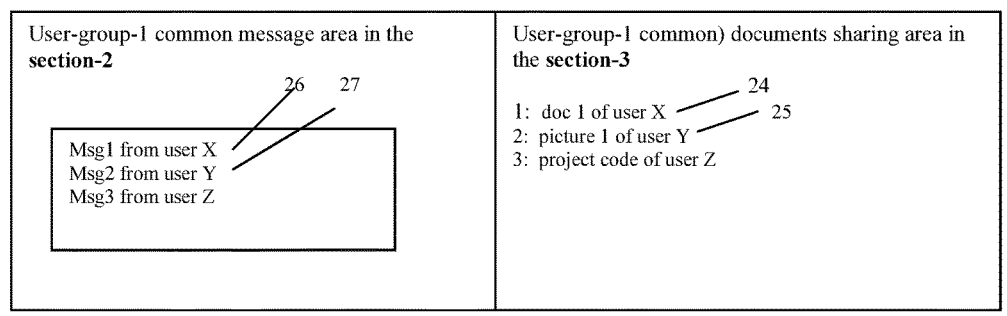

Fig. 7A: A displayed web page having three sections for a user X in one-to-one model for sharing messages, files and folders with a user Y
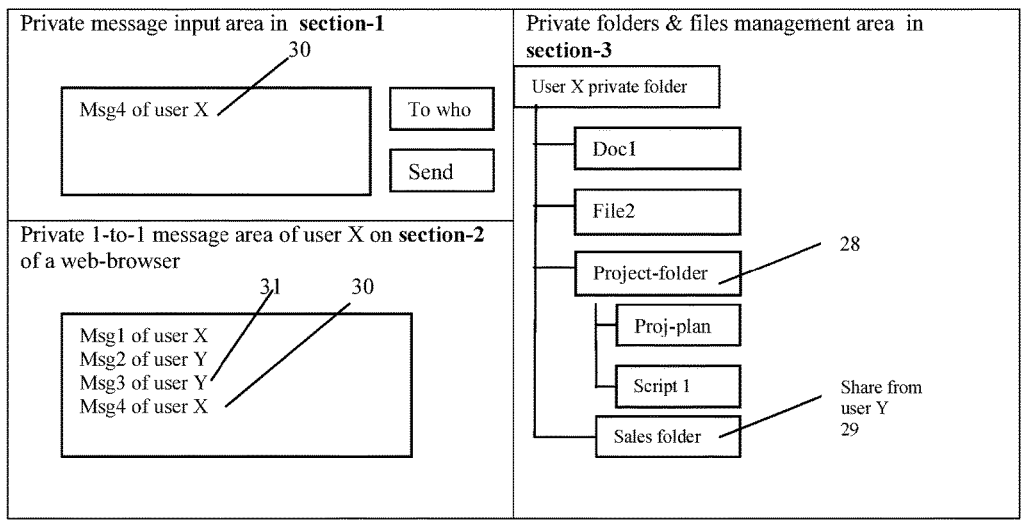
Fig. 7B: A displayed web page with three sections for the user Y in the one-to-one model for sharing messages, files and folders with the user X
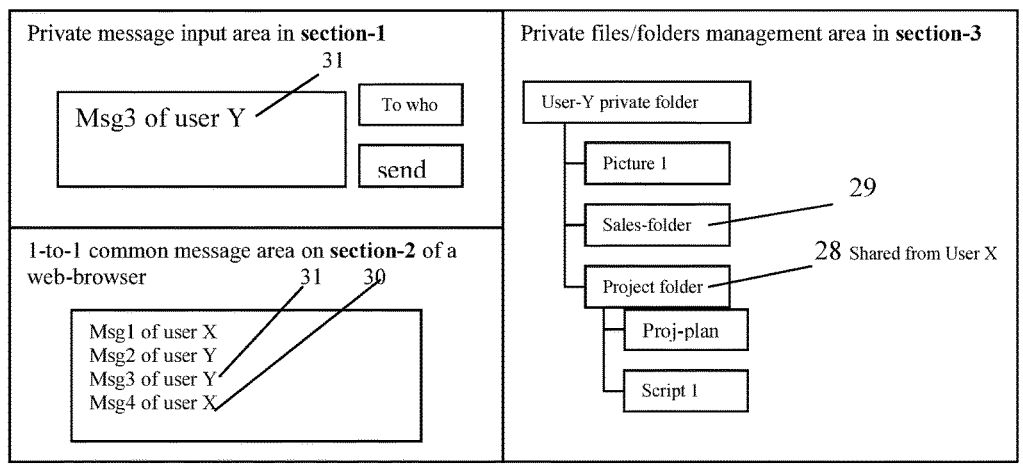

Fig. 8A: An example of web graphically display of assigned resources in a user X's private work space.
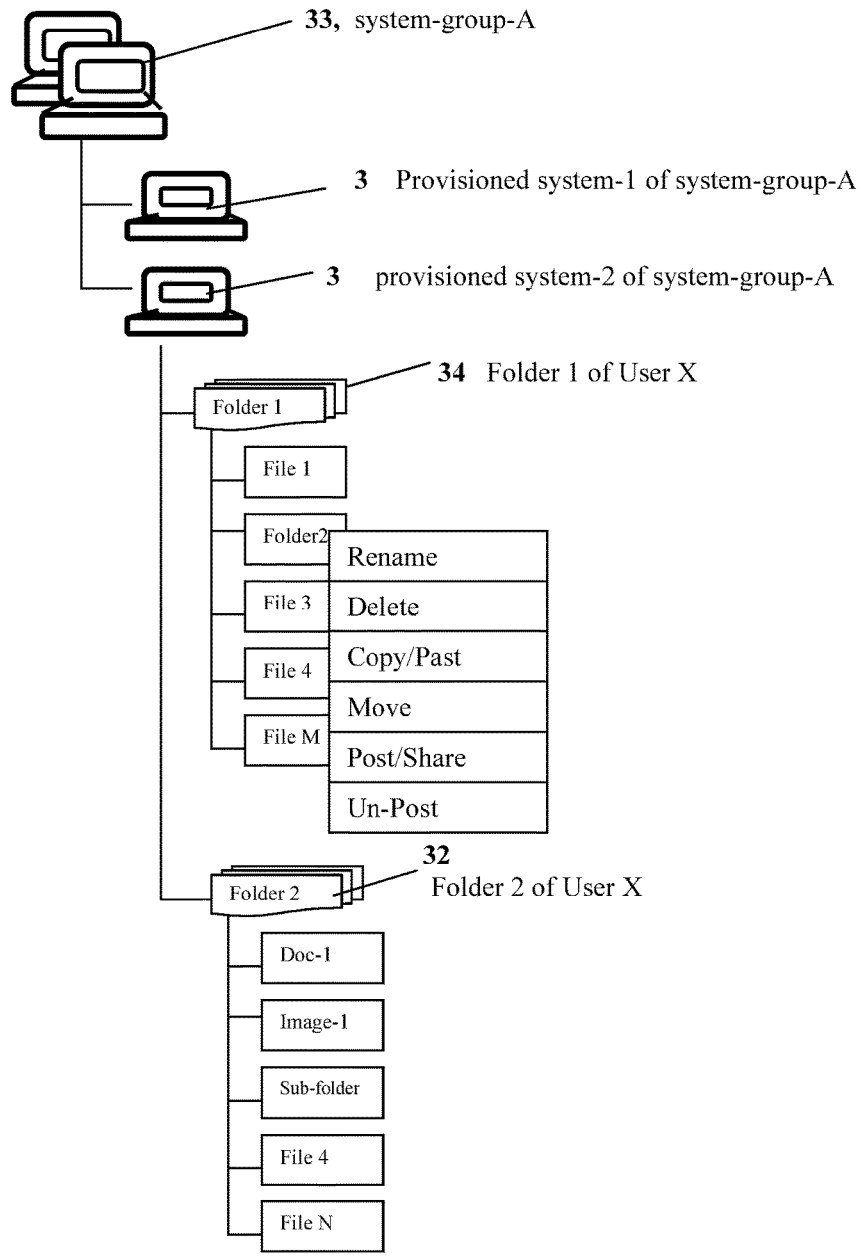

Fig. 8B: An examples of web-based graphical display of assigned resources in a private work space of a user Y.
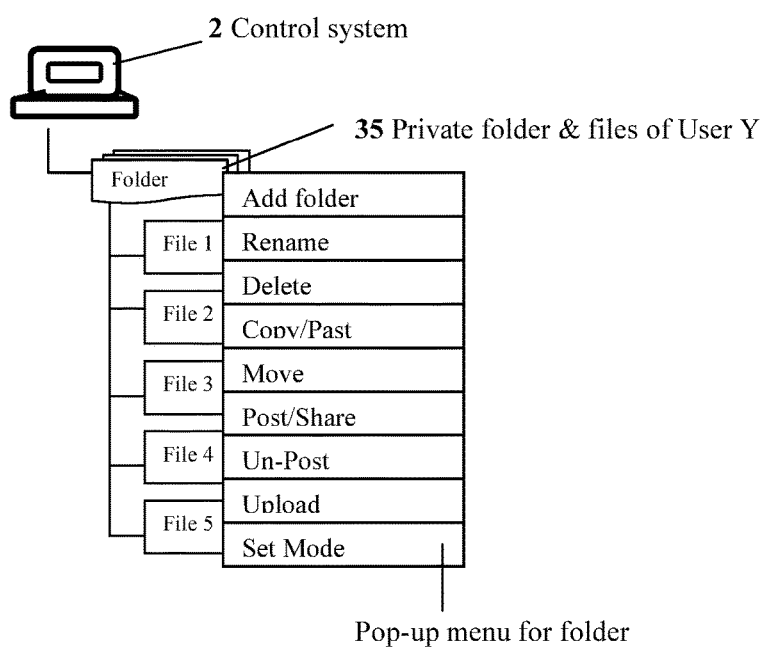
Pop-up menu for folder Fig. 8C: An example of web-based graphical display of the user Y's private work space after the user X dynamically shared a "folder 2" which from the user X's private space for the user Y.
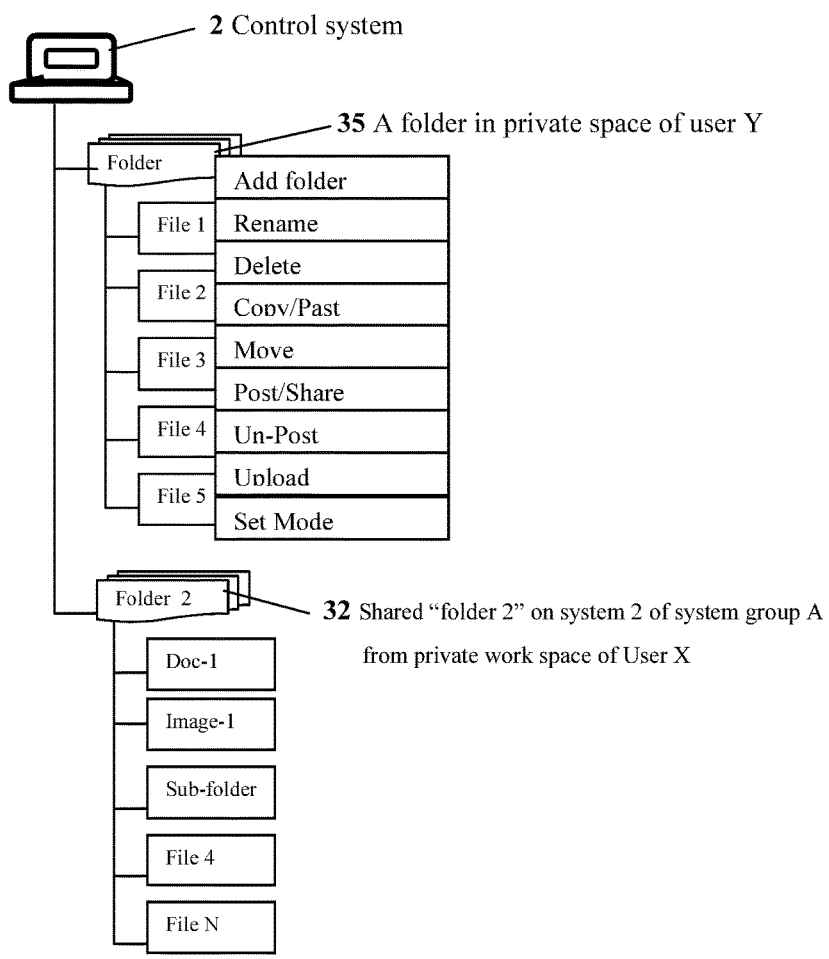

Fig. 9A: an example of pop-up menu for folder operations

| Add folder |
|---|
| Rename |
| Delete |
| Copy/Past |
| Move |
| Post/Share |
| Un-Post |
| Upload |
| Set Mode |

Fig. 9B: an example of pop-up menu for file operations

| Rename |
|---|
| Delete |
| Copy/Past |
| Move |
| Post/Share |
| Un-Post |
| Upload |
| Set Mode |

Fig. 10A: an example of non pop-up operation menu for folder operations:

| Add folder | rename | delete | Copy/past | move | Post/share | Un-post | upload | Set mode |
|---|---|---|---|---|---|---|---|---|

Fig. 10B: an example of non pop-up operation menu for folder operations:

| rename | delete | Copy/past | move | Post/share | Un-post | Set mode |
|---|---|---|---|---|---|---|

Fig. 11: An example of displaying a personal sharing management section for a user X, which comprises a list of posted (shared) files or folders in the file & folder area of a private work space of the user X.

| File or Folder Name | On System | Share to Who | |
|---|---|---|---|
| My-video jpg file | System-1 | Jane | Delete shared? |
| Project plan | Engineer-3 | Jim | Delete shared? |
| C program code for web | Support-2 | John | Delete shared? |
| Picture of building | System-1 | Jane | Delete shared? |
| Engineer Drawing | Engineer-3 | Jim | Delete shared? |
| Patent application-v1 | System-1 | Ted | Delete shared? |
| Folder 2 | System 2 of system group-A | User Y | Delete shared? |
| | | | |
| | | | |
| | | | |
| | | | |

METHOD AND APPARATUS FOR CONTROLLING ACCESS POOLS OF COMPUTING SYSTEMS IN A WEB BASED ENVIRONMENT

PRIORITY

This application is a continuation of U.S. patent application Ser. No. 14/021,062 filed on Sep. 9, 2013 and now a U.S. Pat. No. 9,448,697, which itself in turn is a continuation of U.S. patent application Ser. No. 13/080,007 filed on Apr. 5, 2011 and now a U.S. Pat. No. 8,713,442, which itself in turn is a division of U.S. patent application Ser. No. 11/732,496 filed on Apr. 2, 2007, and claimed the benefit of priority based upon U.S. provisional patent application Ser. No. 60/787,653, filed on Mar. 31, 2006, which in turn referenced provisional application 60/585,552 filed on Jul. 2, 2004. The application Ser. No. 11/732,496 is also a continuation-in-part of U.S. patent application Ser. No. 10/713,904 filed on Aug. 6, 2002 and now is a U.S. Pat. No. 7,418,702. The application Ser. No. 11/732,496 is also a continuation-in-part of U.S. patent application Ser. No. 10/713,905, filed on Aug. 12, 2002 and now is a U.S. Pat. No. 7,373,990. All of the above prior applications and patents are incorporated herein by reference in their entirety for all purpose.

FIELD OF THE INVENTION

The present invention generally relates to communication network. More specifically, the present invention relates to web based communication system.

BACKGROUND OF THE INVENTION

With increasing popularity of using the Internet and World Wide Web ("the Web") for the rapidly changing digital world, individuals as well as enterprises, exchange (or swap) large volumes of information through the Web. The demand for larger and faster information exchange has increasingly grown in recent years. For example, various business meetings and conferences are conducted over the Web with attendees scattered around the world. To enhance the communication between the meeting attendees, not only voice (and/or image) information is important, but also information exchange can be critical.

Fast, volumes, and secure information exchange is important in enhancing the efficiency of a communication network. A problem associated with a conventional network is limited size and speed. For example, a typical email system limits the size of each email, such as 10 megabytes, thereby a reasonable speed of delivery of such email can be achieved. Another problem associated with a conventional network is that various hosts require specific software installation before a user can use their platform. For example, Skype™ requires users to install its proprietary software on the user's systems before it allows them to use its platform.

Accordingly, there is a need in the art to provide faster, more secure, and volume information exchange over the Web.

SUMMARY OF THE INVENTION

The present invention relates to a method and apparatus for information exchange over a web environment.

With the development of central controlled distributed scalable virtual machine (CCDSVM) and the web-based computer user working (operating) environment (WCUWE), the problems mentioned in the previous section can easily be solved by introducing a "dynamic work space" technology of this invention within the frameworks of the CCDSVM and the WCUWE.

With dynamic work space technology, one or more login users of the CCDSVM, each using a browser of any system and from anywhere, can instantly perform tasks. For example, each user can post or un-post messages, files, folders, or other resources on systems of the CCDSVM, with group-based model or non-group 1-to-1 model, to one or more users on said network. This technology will also achieve larger scales of secure information exchange without size limitation and the installation of special software.

The implementation of this invention has provided users with a web browser based, 1-click system that is capable of securing exchanges of messages, files, folders, or other information resources on systems crossing network domains without size limitation.

Additional features and benefits of the present invention will become apparent from the detailed description, figures, and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2A is a block diagram illustrating a layout of a CCDSVM with which users, each from a web-browser on a provisioned system can communicate with each other in accordance with another embodiment of the present invention;

FIG. 2B is a block diagram illustrating a layout of a CCSDVM with only a single control management system to be accessed by a plurality of client systems in accordance with another embodiment of the present invention;

FIG. 3 is a block diagram illustrating an example of a software for a CCDSVM in accordance with one embodiment of the present invention;

FIG. 4B illustrates an example of resources which may be assigned to a user-group common work space in accordance with one embodiment of the present invention;

FIG. 4C illustrates an example of a user's private work space and possible assigned system resources in accordance with one embodiment of the present invention;

FIG. 5 illustrates an example of resource objects on systems in accordance with one embodiment of the present invention;

FIG. 6A illustrates an example of displaying a web page with 4 sections in a web-browser of a user X in a user-group-1 during an interactive online meeting in accordance with one embodiment of the present invention;

FIG. 6B illustrates an example of displaying a web page with 4 sections in a web-browser of a user Y in the user group-1 during said interactive online meeting in accordance with another embodiment of the present invention;

FIG. 6C illustrates an example of displaying a web page with 4 sections in a web-browser of the user X in the user group-1 before the interactive online meeting in accordance with another embodiment of the present invention;

FIG. 6D illustrates an example of displaying a web page with 4 sections in the web-browser of the user Y in the user group-1 before the interactive online meeting in accordance with another embodiment of the present invention;

FIG. 6E illustrates an example of a displayed web page that each of massive online users can access and view from each of their browsers without login to the CCDSVM during said user X and user Y in the user group-1 online meeting in accordance with another embodiment of the present invention;

FIG. 7A illustrates one-to-one, peer-to-peer post or un-post messages, files and folders of a user X in accordance with one embodiment of the present invention;

FIG. 7B illustrates one-to-one, peer-to-peer post or un-post messages, files and folders of a user Y in accordance with another embodiment of the present invention;

FIG. 8A is an example of a web based graphic presentation of assigned resources in a user X's private work space in accordance with one embodiment of the present invention;

FIG. 8B is an example of a web based graphic presentation of assigned resources in a private work space of a user Y in accordance with another embodiment of the present invention;

FIG. 8C is an example of a web-based graphic presentation of the user Y's private work space after the user X dynamically posted and shared a "folder 2" via the user X's displayed private space in accordance with another embodiment of the present invention;

FIG. 9A is an example of a pop-up menu for operating folders in accordance with one embodiment of the present invention;

FIG. 9B is an example of a pop-up menu for operating files in accordance with another embodiment of the present invention;

FIG. 10A is an example of a non pop-up operation menu for operating folders in accordance with one embodiment of the present invention;

FIG. 10B is an example of a non pop-up operation menu for operating files in accordance with another embodiment of the present invention;

FIG. 11 is an example of a displayed list of posted files or folders in a sharable file & folder area of a common work space of a user X in accordance with one embodiment of the present invention.

DETAILED DESCRIPTION

Figure 1:
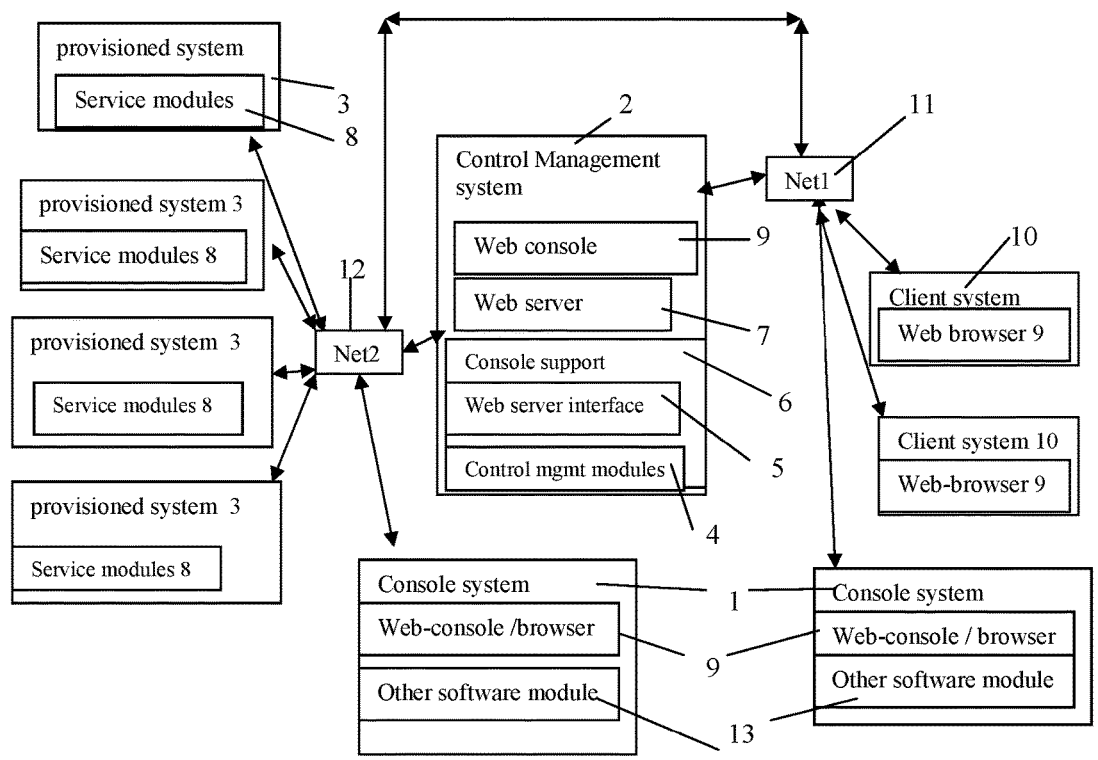
FIG. 1 is a block diagram illustrating a layout of a CCDSVM with a central control management system, and multiple provisioned systems, client systems, and console systems in accordance with one embodiment of the present invention.

Embodiments of the present invention are described herein in the context of a method, system and apparatus for providing a web based communications network with fast, volume, and secure information exchange. Those of ordinary skill in the art will realize that the following detailed description of the present invention is illustrative only and is not intended to be in any way of limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Those of ordinary skill in the art will realize that the following detailed description of the present invention is illustrative only and is not intended to be in any way of limiting. Other embodiments of the present invention will readily suggest themselves to such skilled persons having the benefit of this disclosure. It will be apparent to one skilled in the art that these specific details may not be required to practice to present invention. In other instances, well-known circuits and devices are shown in block diagram form to avoid obscuring the present invention. In the following description of the embodiments, substantially the same parts are denoted by the same reference numerals.

While particular embodiments of the present invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the spirit and scope of this invention.

The present invention can be implemented by a web based system operated in a network infrastructure, such as a central controlled distributed scalable virtual machine ("CCDSVM"). FIG. 1 illustrates a CCDSVM in accordance with an embodiment of the present invention. The CCDSVM includes a group of provisioned systems 3, a control management system 2, console systems 1, and client systems 10. The control management system ("control system") 2 is configured to control a group of systems ("provisioned system") 3. The console systems ("console systems") 2 provide management while client systems 10 ("client systems") initiate accessing the provisioned systems 3 via a web-browser over a network infrastructure, such as a corporate Intranet, the Internet, and/or a LAN.

The network infrastructure ("network") includes all necessary hardware and software that facilitate various users from different geographic locations to communicate through the Internet, an Intranet, and/or a LAN. The hardware of the network includes network connection media, wireless media, circuitry components, and communication equipments. The network connection media includes various cables such as Ethernet and/or optical fiber. The wireless media are capable of establishing wireless communication links through air. The circuitry components include processor, data bus, memory devices, and/or circuit board. The communication equipments, such as switches, routers, gateways, and/or adapters, are used to provide a communications network. It should be noted that there are other possible elements of communication equipment that may be needed to form a communication link, but they are not necessary to understand the present invention.

The software infrastructure includes Internet Protocol ("IP") addresses and system name identification software such as Domain Name Server ("DNS"), firewall software, IP gateway set-up software, IP broadcast. The communication protocols over the network could be IP-based standard or non-standard proprietary protocols such as Hypertext Transfer Protocol ("HTTP") over Transmission Control Protocol/Internet Protocol ("TCP/IP") or Simple Object Access Protocol ("SOAP") over TCP/IP. It should be further noted that some of the IP based protocols are proprietary protocols and some of them are non-IP based protocols.

A web-browser is an application program that allows a user to access information over the Web, such as Windows Internet Explorer ("IE"), FireFox, Netscape, and/or Mozilla. A web-browser could also be any proprietary software, which uses web-protocols such as HTTP, WAP, SOAP for communication over the network. The web-browser can be implemented with any suitable programming languages such as C, C++, Java, or XML, or a combination of the suitable languages.

A web page, on the other hand, is a displayable for information resource and is accessible through web-browser. The web page may be hosted by a web server via a web server system and can be transmitted (or retrieved) by a web-browser.

The provisioned systems 3, client systems 10, console systems 1, and control management system 2 are computational systems, which could be server system, desktop or laptop system, handheld devices such as PDA, wireless phone, and so forth. The computational system includes CPUs, storage devices, and memory controller. The storage devices include internal memory such as read-only memory ("ROM") and/or random access memory ("RAM"). The storage devices may further include external storage devices such as magnetic disks or tapes drives, include redundant array of inexpensive disk drives ("RAID"), just bunch of disk drive ("JBOD"), and memory stick. The associated storage controller can be Integrated Drive Electronics ("IDE"), Small Computer System Interface ("SCSI"), Fiber optical controller, or a combination of above-mentioned devices.

The computational systems also include non-embedded or real-time embedded operating system ("OS"), which could be Linux, or Windows, Unix, or proprietary OS. It should be noted that the present invention may include multiple control systems at different layers of a system configuration topology, where each of the control systems is capable of communicating with each other through a network. The control systems at middle layers play dual roles as both control system and provisioned system in the system configuration topology.

FIG. 1 illustrates a CCDSVM platform with multiple clients 10 in accordance with one embodiment of the present invention. The CCDSVM includes the console systems 1, a control management system 2, the provisioned systems 3, and networks 11-12, wherein networks 11-12 are used inter-connecting with all systems of the CCDSVM and the client systems 10.

The console system 1 is a computational system having a web-browser or (web-console) 9 wherein the web-browser is used by privileged users for accessing the CCDSVM platform. The web browser 9, which could be on any system, permits a user to access information from of the CCDSVM by following a web URL link. For example, a privileged user enters a URL of "https://69.107.28.123/stt/sttwebos" on a command line of the web browser 9 and once the link is established, the user can obtain information hosted by the web-based computer user work/operation environment ("WCUWE"). The console system 1, in one embodiment, further includes software modules 13, where the software modules 13 may be used to facilitate communication between the console system 1 and the control management system 2.

The control system 2, in one embodiment, is a server system, a desktop or a laptop system with the memory and storage capabilities. The control system 2 includes web server software 7 and console supporting software 6. The console supporting software 6 includes web server interface software modules 5 and control management software modules 4. The control management system 2 may also have a web-browser 9 used as a web-console 9 of the control system 2. The web server software 7 sends/receives data to/from the web-console 9 of the console system 1 or the client system 10 or the control system 2. The web server software 7 is configured to provide secure sockets layer ("SSL") encryption to encrypting the data before transmission to enhance the security. The web server software 7 could be commercially available software such as Apache™ from open source, or IIS from Microsoft or a proprietary software. The web server software modules 7 and console support software modules 6 can be implemented by any suitable or a combination of any suitable programming languages such as C, C++, Java, JavaScript, HTML, or XML.

The console supporting software 6 communicates with the service software modules 8 of the provisioned systems 3. The web server interface 5 of the console support software 6 is capable of providing special functions that are otherwise performed by the web server 7. If there is no provisioned system 3 coupled to the CCDSVM platform, the control management system 2, in one embodiment, is reconfigured to continue monitoring systems over the network while the CCDSVM platform is also reconfigured into a single stand-alone system, as shown in FIG. 2B. Therefore, users can access and/or obtain resource objects or system resources via the web-browser 9, which can be resided on any client system 3 or console system 1.

The provisioned system 3, in one embodiment, is a computational system, where the system may contain suitable operating system ("OS"). The provisioned systems 3 can be automatically provisioned by the control system 2 through an automatic system service pool construction protocol. Provision process, also known as pooling process, is a method allowing the control system 2 to control one or more network systems by reconfiguring the network systems. For example, when a provisioned system boots up via said communication protocol, the control system 2 automatically obtains provisioned system's name, IP address, and system information, wherein the system information includes network information, storage information, file system information and so forth. Thus, each provisioned system 3 can be monitored, accessed, and/or operated by a user(s) through the web-browser 9 on the console system 1. In an alternative embodiment, provisional system 3 is controlled by users through client systems 10 via the control system 2 with proper users' authentication. Each provisioned system 3 contains service software modules 8, which is used to communicate with servers over the Web. For example, the service software modules 8 of provisioned system 3 can communicate with the control management software 4 of the control system 2 to carry out tasks for viewing or operating resources of provisioned system 3. The service software 8 can communicate with the web-browser 9 of the client system 10 or console system 1 to transfer data between them or deliver service to them, or to communicate with another provisioned system 3 to send or receive data.

The service software modules 8 may include special software modules having compatible functionalities of the web-server software 7 of the control system 2 for dedicatedly handling HTTP protocol or other web protocols if there is needs for web-based communication with the client 10 or with the other provisioned systems 3 or with the control system 2. The software modules 8 could be commercially available web server software 7 or proprietary software. The service software modules 8 could be implemented with any suitable programming languages such as C, C++, Java, or JavaScript.

Net 11 and Net 12 are network infrastructures that are capable of providing communication links between the control management system 2, console systems 1, client systems 10, and/or provisioned systems 3.

The client systems 10 may not be a part of the CCDSVM, but with the permission and authorization, a user from the web-browser 9 of the client system 10 can login to the CCDSVM and access the permitted resources of the CCDSVM by following a web URL link of the CCDSVM. While the privileged users can obtain, manage, access, and/or operate system resources of the CCDSVM through the WCUWE, regular (non-privileged) users at the client systems 10 may be permitted to access only limited system resources of the CCDSVM.

The CCDSVM configuration, in one embodiment, includes four data flow paths. First data path is a communication link between the web browser 9 of the client host 10 (or console host 1 or control management system 2) and the web handling software on the control system 2 (such as web-server 7 or console support software 6). With this path of data flow, whenever a user sends a request from the web-browser 9 to the web-server 7 or the console support software 6, the console support software 6 collects required information from target provisioned systems 3 and converts the information into standard structured information (web-format) for web communication. The targeted system could be one of the provisioned systems 3 or the control system 2. The information collected by the console support software 6 of the control system 2 could be the system status, or the storage information, or the network information, or the user authentication profile, or the file system information, or files & folders information on the control system 2, or any targeted provisioned system 3. The console support software 6 then passes this converted structured information to web server software 7 and further sends it to the web-browser 9 through a communication link of the Net 11 and Net 12 so that it can be displayed and viewed by the conventional web browser 9, as shown in FIG. 1.

The communication protocol used between the web-browser 9 of the client system 10 (or the console system 1 or the control system 2) and the web server 7 of the control system 2 could be HTTP, HTTPS (SSL encrypted HTTP protocol) or any suitable web protocols for web communication, which could successfully transmit the data across the web or could be other standard or proprietary IP-based on non-IP-based protocols. This data path may be referred to as the console support software 6 transmits data to or receives data from the web-browser 9 or web-server 7.

The second data path is the data flow through communication links between the control system 2 and provisioned systems 3. Requests targeted to a provisioned system 3 are passed from the console support software 6 of the control system 2 to the service modules 8 of the provisioned systems 3 through communication link network 12. When the responses for those requests are received from the control system 2, the service modules 8 of the provisioned system 3 carry out the requested tasks, and then send the response back to the console support software 6 of the control system 2. The implementation of the actual products of this invention for the second data path may use proprietary TCP/UDP/IP based protocols for the communication between the provisioned systems 3 and the control system 2. However, other standards or proprietary IP-based or any suitable non-IP-based protocol are also possible. The communication protocols used between the console support software 6 of the control system 2 and the service modules 8 of the provisioned system 3 can be any suitable IP based or non-IP based protocols, whichever is suitable to transmit data between them. The typical data flow through this path could be the boot message, system status, network information, or storage information of the provisioned system 3 as shown in FIG. 1.

The third data path is the data flow between the provisioned systems 3 and the client system 10 or the console system 1 via the communication links of the net 11-12. Referring back to FIG. 1, the console support software 6 of the control system 2 may present a web link, which points to an object on a provisioned system 3, to a user working via a web-browser 9 on the client system 10 or the console system 1 or the control system 2. The object pointed by the web link on the provisioned system 3 could be a text file, MPEG video, PDF document, MS Power Point, Word documentation and others. It also could be a link of another web service application program. From the web browser 9, a user can directly access the information on a provisioned system 3 pointed by the web link without go through the control system 2 again. In this case, the service modules 8 of the provisioned system 3 also include web server software modules 7 or equivalent one to directly support the web browser 9 as mentioned before. The communication protocols with the third path could be web protocols such as HTTP or WAP. Alternatively, the communication protocols can be other standards or proprietary IP-based or non-IP-based protocols. To simplify the discussion, the data transmitted on this path will be mentioned as the service software module 8 that send data to or receive data from the web-browser 9 and/or vice versa.

The fourth data path is data flow through communication link between a provisioned system 3 and another provisioned system 3. With this path, the service modules 8 of one provisioned system 3 can directly transmit data or information to the service modules 8 of another provisioned system 3 via a communication link of the Net 12 without going through the control system 2. The implementation of the actual products of this invention, for example, uses a proprietary IP-based protocol for communications between the two provisioned systems 3. The principle of this invention, however, does not rely on or limit to proprietary protocol. It should be noted that other standard or proprietary IP-based or any suitable non-IP-based protocol may also be possible. The data and information transmitted through the fourth data path can be various types of data. For example, a user at a web-browser 9 may open a file folder on a provisioned system 3. The user can also instruct to transfer a file from a current target provisioned system 3 to another provisioned system 3 by a mouse click. The data file will then be transferred directly between the two provisioned systems 3 without going through the control system 2.

FIG. 2A illustrates a variation of the CCDSVM platform for the web browser-based communication in accordance with one embodiment of the present invention. The CCDSVM platform illustrated in FIG. 2A is similar to the platform illustrated in FIG. 1 except every provisioned systems 3 includes a web-browser 9. Thus, with proper authentication process, each user of provisioned systems 3 may access, manage their own provisioned system 3 from the web-browser 9 either on their own local provisioned system 3 or on any client system anywhere on the network. It should be noted that when a user is registered with a provisioned system 3, the user is authorized to access provisioned system 3 locally but not with the CCDSVM. On the other hand, when a user is registered with CCDSVM, the user is then authorized to access the multiple provisioned systems 3 and the control system 2 of the CCSDVM.

FIG. 2B illustrates another example of a variation of CCDSVM, in which there is no provisioned systems 3 in the CCDSVM. The Control system 2 can run on its own and the CCDSVM has degenerated into a single stand-alone system (FIG. 2B), and users through web-browser 9 on any client system 3 (or on console system 1, or on stand-alone control system 2) are allowed to access and operate the permitted resource objects and system resources on the stand-alone control system 2.

Unless specifically specified, the console support software modules 6 of the control system 2, the provisioned systems 3, the service software modules 8 of provisioned system 3, and the web-browser 9 on the control system 2, the client system 10, and the console system 1 are referred to the CCDSVM platform illustrated in FIG. 1.

A web-based computer user work/operation environment ("WCUWE") of CCDSVM is a software infrastructure, shown in FIG. 3, which provides each permitted user to log into CCDSVM and further provide each user a private web-browser based operating environment, which is a private work space including the assigned and permitted resources on the control system 2 or on the provisioned system 3 across the network. The WCUWE further provides each user from a single web-browser to perform various permitted tasks and operations over various system resources (FIG. 5), further, the tasks can be performed concurrently from a single web-browser.

The tasks include allowing privileged users to create users, groups, assign users to each group, to assign initial associated system resources to each user or group, and to save the information of created users and groups into a database stored on storage media of the control system 2. The information needed for creating users or groups include user names, user IDs, assigned security permissions, passwords, access points, group names, group IDs, maximum members in a group, and so forth. The tasks also include various system operations such as manage network, storage, file system, folder, files, messages, user security, and so forth.

The database is organized as one or more lists of tables, wherein each of the lists contains information for various resources. The resources could be one or multiple users' information, one or multiple systems' information, one or more network cards, and one or more disk drives information. The storage media could be a system's internal storage or disk drive, for example.

The WCUWE of the CCDSVM includes software modules of present invention. For example, the software includes the console support modules 6 of the control system 2, the service software modules 8 of the provisioned system 3, the other service software 13 of the console system 1. The current implementation of the WCUWE is based on a proprietary design of this invention. However, the nature and spirit of this invention does not limit to proprietary designed software. The WCUWE of the CCDSVM also includes other proprietary software modules or conventional software such as the web-server 7 of the control system 2, the web-browser 9 of the control system 2, the client system 10, and console system 1.

The WCUWE of the CCDSVM can be implemented with any suitable or combination of various suitable programming languages such C, C++, Java, JavaScripts, HTML, XML, and so on. To simplify the discussion, the WCUWE will be used to represent software modules in the CCDSVM described above.

Users of the CCDSVM may be created by the CCDSVM though a given process or any users on the Internet, Intranet, LAN without registering with CCDSVM. The WCUWE of the CCDSVM provides user to access various resources and perform various tasks through a preferred model of mouse clicking on graphically represented resource objects on the browser 9.

Figure 4A:
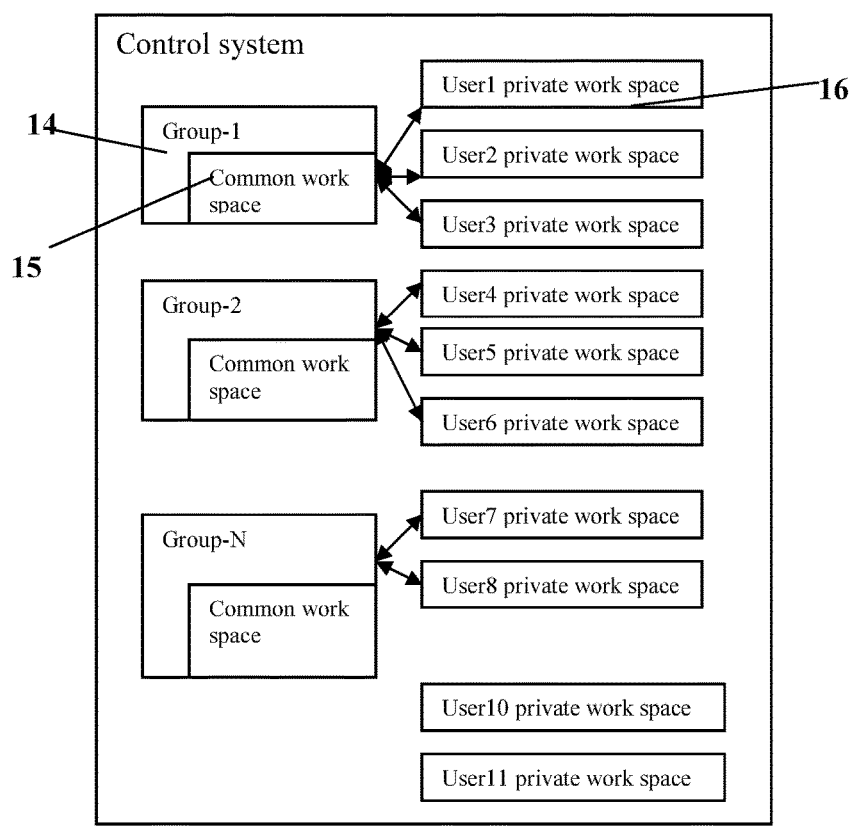
FIG. 4A illustrates an example of a dynamic work space in accordance with one embodiment of the present invention.

The WCUWE is designed to be operated on a CCDSVM platform, and specially is designed to provide dynamic work space (FIG. 4A) to each user associated with the various CCDSVM. The WCUWE further facilitates each user performs tasks of instantly posting or un-posting user's private resources information to peers in a group or to each peer user of the CCDSVM not in a group or not in same group, or to massive public users on the network, where the massive public users do not have accounts with the CCDSVM platform.

The dynamic work space of the WCUWE is a centrally controlled collection of each group's work space and/or user's work space. The console support software 6 of the control system 2 of the CCDSVM will assign each user a private work space and each group a common work space when each user or group account is created by a privileged user after corresponding WCUWE software modules on the control system 2 and provisioned system 3 enter into an operational mode. When a user or a group account is created, each user is assigned to a specific user security scope and permission. An important aspect of the WCUWE of the CCDSVM is that it assigns each user and/or each user-group a working space based on user and group security permission.

A work space is an organized information structure, which can be saved on storage media of memory or disk drives or both of memory and disk drives by the console support software 6. A work space is created during a privileged user performing the tasks of creating user or group. The work space will be initiated and assigned with system resources of the CCDSVM as shown in FIG. 5. Various system resources on either the provisioned system 3 and/or on the control system 2 include respective memory, system-groups, computing systems in a system-group, file system, file folders, files, storage media, network media and so on. The common work space 15, shown in FIG. 4A and FIG. 4B, of each group may be initially assigned with information of system resources (FIG. 5) such as users in this group, message area, file systems, folders and files on a specific provisioned system 3 or on the control system 2, and so on. The resources of the common work space may also be dynamically assigned or allocated by permitted user after creating group account. For example, during an online interactive meeting, a user posts a file to the common work space, so that a new entry of a file node is added to a file and folder tree area of common work space. In addition, each group may be assigned with one or multiple users, wherein each user can also be assigned with a private work space 16 illustrated in FIG. 4A and FIG. 4C during user account creation time. The private work space may also be initially assigned with system resources of the CCDSVM during user account creation time. Alternatively, the private work space is dynamically assigned with the resources of the CCDSVM after the user account being created.

For example, a privileged user can dynamically permit or deny a general user to access a list of storage devices. During the operation, at one second, the user may see the list from the user's web-browser, and at another second, the general user will no longer see the list. Also, if the authorized user can access to the list of the storage devices on a provisioned system 3, and further can take one of the devices offline so that the device list on the provisioned system 3 will have one less devices to be displayed.

In another example, another example, at one second, a privileged user allows a general user to access a file J in a folder N on a system M of the CCDSVM, and at another second, the privileged user resets the previous permission, thereby, the general user can view and access the file J in the folder N of the system M of the CCDSVM at one time, and a second later, the general user can not view and access the file J any more. The actual implementation of console support software 6 of control system 2 has achieved this capability.

In addition, each type of resources in the work space is organized as a list of tables and can be stored in storage media in the control system 2. The integrity of security of each group is protected by limiting different resources to different group. As such, each group is authorized to have a limited view over assigned system resources on the provisioned system 3 as well as on the control system 2. The same security integrity at user level can be achieved by assigning different system resources of the provisioned system 3 and/or the control system 2 to different individual user based on assigned security permission. Therefore, each user is authorized to access and view the assigned resources only.

FIG. 4B has shown an example of assigned resources of users 17, message area 18, folders and files area 19, and other areas 20 in the common work space 15 of a group. The messages, from each user in the user group, in the common message area 18, and the information of folders and files in common files and folder area 19 can be shared by all users in the same user group. All resources in each group's common work space can be selectively displayed in the web-browser 9 of each login user, who belongs to the same user group after said resources in said group being converted to presentable web-format (web-page) by the console support software 6 of the control system 2 of a CCDSVM.

FIG. 4C has shown an example of resources in private work space (16) of a user, which has assigned private message area 21, private file, folder area 22, and private network or storage or other information areas 23. The assigned resources only can be exclusively viewed and accessed by the designated user unless he/she agrees to share with peer user crossing group boundary or with peer users in a same group. The folder (directory) is a data structure which can hold one more files and sub-folders at logical file system level and at physical level on storage media.

FIG. 8A has shown an example of displaying an actually implemented portion of web-page encoded with assigned resources in private work space of a user X, which includes a system-group-A 33 on said network, multiple provisioned systems 3 under the system-group-A, private folders 32 and 34 of the user X on a system, and files under the folders 32 in the displayed private work space of the user X.

FIG. 8B has shown another example of displaying an actually implemented portion of a web-page encoded with assigned resources in a private work space of a user Y, which includes a control system 2, private folder and files 35 of the user Y in the displayed private work space of user Y.

The private work space of the user X and user Y may also include private message area 21 and other resources, which are not displayed in FIG. 8A & FIG. 8B because the WCUWE is designed to dynamically display part of user's private work space whenever there is needs.

It is notable that said user X and user Y, may be in same user-group such as in said group-1, however, each of them could have a significant different scope of the private work space assigned by the console support software 6 of the control system 2 due to each of them has been assigned with very different resources on the systems depending on each user's role and security permission, which is setup by the privileged user of the CCDSVM through web-based user interface provided by the console support software 6. This is the beauty of the invention of WCUWE for CCDSVM.

The FIG. 6C and FIG. 6D are examples of a web-page displayed in said web-browser 9 of each of the user X and user Y in the user group-1 before an interactive online meeting. As shown in FIG. 6C and FIG. 6D, the user X or user Y or other users (who's web-page/browser did not depicted) in the same user group-1 have entered a group online meeting after their login to the CCDSVM from each browser 9 on any system on said network, and all get an identical web-page provided by the console support software 6 of the control system 2 except with different contents in the displayed private work space section of the web-page due to each user has assigned with different resources. The web-page screen layout provided by console support software 6 contains four sections:

1) a private user message input area (section-1),
2) a message displaying section for displaying common message area 18 shown in FIG. 4B for all users in a user group-1 (section-2),
3) a file or folder display section for displaying group common file and folder area 19 shown in FIG. 4B for all users in same user group-1 (section-3), and
4) a file and folder tree displaying and management section (section-4) for displaying user folder and file tree in private file and folder area 22 of a user's private work space 16.

Initially, the section-1, section-2, and section-3 are all empty due to no one has posted any file or message yet. The console support software 6 gets each login user's portion of assigned folders and files for the online meeting from the stored private file and folder area 22 of the private work space 16 of each user on said storage media, and further converts said file or folder information to presentable web-format (web-page) to be displayable in said section-4 of the web-page in web-browser 9 of each user. The choice of total four sections of the web-page layout and the order of each section on the browser screen 9 is irrelevant to this invention since other choices of designing are also possible, and further, this invention does not have limitation on what web-screen layout shall be. The information of the file or folder includes the system name where the file or folder resided, the name and path of the file or folder, the owner of file or folder, the time stamps, the size of the file and so on without limitation.

During the interactive online meeting, the console support software 6 provides each user to post or un-post files or folders to said section-3 of displayed group's common documents and contents management section with several steps. First, for example, providing said user X to click on one targeted file "Doc 1" 24 or "sub folder-1" a time in section-4 of displayed said file and folder management area of said user X's private work space 16. Second, select the operation of either post or un-post from an operation menu (see FIG. 9A, FIG. 9B, FIG. 10A and FIG. 10B). Finally click on the selected operation to submit the task of either post or un-post the selected file or folder.

Each user with permission may perform un-post operation if such user has at least a previously posted file or folder, which has already displayed in section-3 of the common document and content management section of said web-browser 9 of each login users in said same user-group, see FIG. 6A or FIG. 6B for example.

If a file is selected, the file operation menu is used and if a folder is selected, the folder operation menu is used respectively. It is also possible to only provide one menu for both file and folder operation by said console support software 6. The operation menu either can be pop-up menu for folder as shown in FIG. 9A or pop-up menu for file as shown in FIG. 9B, or non-pop-up menu for folder as shown in FIG. 10A or non-pop-up menu for file as shown in FIG. 10B. The choice of operation menu is irrelevant to this invention although the actual implementation of this part of invention has used pop-up menu, and as matter of the facts that there is no limitation on how the operation menu is to be designed in this invention.

In the example of FIG. 6A, the user X can post a file named "Doc 1" 24 to said section-3 of the common document and contents display section in said web-browser 9. In the example of FIG. 6B, the user Y also can post a file named "picture 1" 25 to the common document and contents display section in said web-browser 9. In addition, another not depicted user Z posted a file of "project code". The files or folders could be one on said control system 2 or on any provisioned system 3 of the CCDSVM.

In addition, during the interactive online meeting, the console support software 6 of the control system 2 also provides each user to post message to users in same group from said section-1 of the private user message input section after typing a message and click on the "send" button. In the example of FIG. 6A, the user X posted a message of "Msg1 of user X" 26. In the example of FIG. 6B, the user Y also posted a message of "Msg2 of user Y" 27. In addition, another non depicted user Z posted a message of "Msg3 of user Z". As a result, all of three messages were displayed in the same section-2 of each user's browser.

In a specific situation, the console support software 6 also provides permitted user to un-post the previously posted message. Just for example, in FIG. 6A, the console support software 6 provides the permitted user X to select a previously posted "Msg2 of the user Y" 27 from said section-2 of the common message display section of said web-browser 9 of the user X, and select un-post operation from said operation menu and submit the selected un-post task.

The detailed information of how the post or un-post task to be implemented will be discussed in next two paragraphs. In addition, with this invention, the action of the "post" information such as posting information of files or folders or messages or other resources is equivalent to the action of "share" the information. The action of "un-post" information is equivalent to the action of "un-share" a previously posted or shared information, in other words, to "remove" the previously posted or shared information.

After transmitting information data of the post or un-post task from the web-browser 9 of the console system 1 or client system 10 or control system 2 to the control system 2, the console support software 6 of the control system 2 obtains and parses the information data to determine: who is the original user initiating the task; what type of task; what type of associated resources for task to work on; who is the targeted user; and what is the time stamp, and may also include other information without limitation. The console support software 6 further determines that if the task is to post a file or folder from said original user, the console support software 6 picks up the corresponding file or folder information that from file and folder area 22 of the private work space 16 of the original user, and then deposits such information to the file and folder area 19 of the common work space of said group 15 in this case.

If the task is to un-post a previously posted file or folder, from a specific user, in said common work space 15 of said group, the console support software 6 search for the corresponding information of the file or folder in the file folder area of said common work space 15 of said group and further remove the entry of matched information from said common work space of said group after it is found.

If the task is to post a message to users in said group, the parsed message will be stored in the private message area 21, of the original user's said private work space 16, and also is copied to the message area 18, of the common work space 15, of said group by said console support software 6.

If a task is to un-post (delete/remove) a previously posted message, the console support software 6 searches for a matching message in said common message area 18, of said common work space of said group, and remove such message entry if it is found based on the message and original user's identification and other associated information such as time stamp, security permission and so on without limitation.

It shall be noticed that the task of un-posting a file or folder of this invention does not actually delete the file and folder from original user's private work space. In addition, a lock protection mechanism is deployed whenever a message or information of a file or folder is written, stored, or deposited to either said private work space or said common work space, or to said disk drives or other storage media. Throughout the rest of discuss, the lock protection is assume to be a default action without further mentioning whenever a write/store/deposit action take place. As matter the fact, each task of posting file, folder, and message as well as the task of un-posting the previously posted file or folder, or message performed by multiple users in multiple groups with this invention can be executed by the console support software 6 instantly with memory speed.

FIG. 6A and FIG. 6B illustrate that after the console support software 6 of the control system 2 successfully executing the tasks for each user in each group, any user in said user group can get a fresh view of said section-2 of the common messages display area of the user group-1, and a fresh view of said section-3 of the common documents & contents display area of in each user's said web browser 9 on the client system 10 or on the control system 2 or on the console system 1.

User can manually click on a refresh-button, which does not show on the FIG. 6A and FIG. 6B, to refresh corresponding part of screen of either said section-2 or section-3 in the browser 9. Also said corresponding part of browser screen of said section-2 or section-3 can be automatically refreshed. As mater of the fact, optionally, the console support software 6 has encoded a run-time script in said web-page, which is encoded with said presentable web-format and to be displayed in said web-browser 9 after each user login to the CCDSVM and started group online meeting.

The run-time script will automatically and periodically perform tasks of refreshing said section-2 and section-3 of the web browser 9 screen. The frequency of the periodic refreshing can be adjusted by said console support software 6 of the CCDSVM depending on the needs of the meeting, which typically can range from 1 to 3 seconds and there is no limitation on this aspect. Also, with the preferred example, said run-time script provided by the WCUWE is a JavaScript, however, other type of programming scripts or methods are also possible and there is no limitation on what kind of run-time program shall be used in this invention. In addition, the console support software 6 provides each user the choices of either automatic or manual refreshing their web-browser 9.

Upon refreshing said section-2 or section-3 of said web-browser 9's screen of each user, a request of updating such screen will be generated and sent from said web-browser 9 to the control system 2. The console support software 6 obtains and parses each request to determine what user group, and which part of said common work space of said group need to be updated.

Based on information of each parsed request, the console support software 6 of the control system 2 retrieves the updated resources and objectives from said common work space 15 of said user group, which includes recently posted files, folders, or messages from each user in said group, and also includes the updated list of files and folders or messages after un-posting one or more files or folders, or messages by the users in the same group. Finally, the console support software 6 of the control system 2 converts retrieved information of the resources and objects to the presentable web-format (web-page).

If the request is to update the group messages, the converted information is sent to the section-2 of the group common message display area in corresponding user's said web-page/web browser 9. If the request is to update the group common files and folders display area, the converted information is sent to the section-3 of said web-browser 9. Therefore, after refreshing said sections on said web-browser 9, each user can have an identical view of all posted files and folders in the section-3 of group common document display area on said browser 9, and can have an identical view of all messages in the section-2 of the group common message display area on said web-browser 9, which are posted by all other users in a same group. Meanwhile said console support software 6 still allow each user kept most of the resources and objects in their own private work space un-exposed to other users in the same group during the online interactive meeting.

For example, the User X at his/her web-browser 9 can see "picture 1" 25, posted by the user Y, in the group common file and folder display area but can not see other information in the user Y's private work space area, and can see the "Doc 1" posted by the user X himself. Also, the user Y at his/her web-browser 9 can see "Doc 1" 24, posted by the user X, in the group common file and folder display area but not other information in user X's private file and folder display area, and can see the "picture 1" posted by the user Y himself.

A difference between a conventional Internet group communication model and the group based communication model described in the present invention is that the console support software 6 of the control system 2 provides each user to control post or un-post said resources from user's own displayed private work space while the conventional Internet communication model are not capable of performing such posting/un-posting task. Also, for example, un-posting a previous posted file or folder with the WCUWE of the CCDSVM does not delete the file or folder materials in the user's private work space while the delete operation with existing Internet group communication model will completely delete the file or folder. The dynamic work space of this invention has combined with security protection for the information and, flexibility and efficiency for online meeting provided by the WCUWE of the CCDSVM for each of user and groups in online meeting.

In addition, with a preferred example, since posted information of each file is encoded by said console support software 6 with a web link and displayed in said section-3 of the web-browser 9, therefore, each user in a user-group can click on said link to download the file, which provided in the private file and folder area 22 of the private work space 16 of their peer users in said group, from a system where the file is physically located. For example, the user X can download said "picture 1", which may reside on either a control system 2 or provisioned systems 3, from the user Y, while the user Y can download said "Doc 1", which also may reside on either a control system 2 or provisioned system 3, from the user X at same time. This achieves a true peer-to-peer exchanging files on permitted system from permitted users in said user group. In addition, there is no limitation on the file size of the file to be downloaded, which is a gifted benefit from Internet technology. Besides the exampled and understandable method of download, other methods of retrieve peer users' digital documents or contents are also possible by deploying a more efficient proprietary file transfer mechanism to reach the results of said exchanging file. It shall be noted that the method of download is only applicable to the files and does not apply to folder and other resource information. To get a targeted peer user's entire folder and the underneath files and sub folders, a special files and folder transfer method is required.

As shown in FIGS. 9A & 9B, and FIGS. 10A & 10B, the console support software 6 of the control system 2 also provides each user to perform many other tasks during online meeting through said operation menu such as upload, rename, delete, copy/paste and so on without limitation. The upload operation allows each user to dynamically upload files one a time through the web-browser 9 from a local storage of the client system 10 or console system 1 to said user's private work space on the control system 2 during the meeting, and further to be posted to said common space of a user group that each user belong to.

The mouse click driven copy/past operation allows files and folders from permitted folders of permitted provisioned systems 3 to be dynamically physically copied to each users' private work spaces 16 on the control system 2, and the information of said files and folders could further to be displayed via said web-page in the browser 9 of each user and to be further posted to the common work space 15 of said group which each user belong to in addition to the direct posting these file or folders as described in previously—without physical copying over. As matter of the fact, operations provided by the console support software 6 of the control system 2 have added efficiency to posting or un-posting files and folders for each user depending on the real needs.

Additionally, said console support software 6 provides each user of each group capability of saving the posted messages in the common message area 18 of said common work space 15 of each group as a file in the common file & folder area of said common work space 15 of each group. Further, the saved file can be viewed, downloaded by each user in each group with same method of posting. Besides whenever there is a need, said console support software 6 provides users to reset message area to be empty by removing all message entries in the message area 18 of said user group's common work space 15.

An important fact is that the designed WCUWE of the CCDSVM has provided concurrent users each from a single web browser anywhere on the network to securely perform permitted various tasks, which could be run concurrently within a single web-browser. Because of the console support software 6 of the control system 2 let each users have exclusive view for resource objects in his/her private work space 16 and in said common work space 15 of a group which each user belong to and let each user to manage resource objects in his/her own private space, the multiple users in multiple user groups can concurrently post or un-post files, folders, messages, or other resource objects without interfere users in other user-groups. Thus, the work spaces of each user and each group are well protected.

Hence, the console support software 6 of the control system 2 provides privileged users to perform tasks of creating multiple users and user groups on the control system, and each group can be assigned with variable size of the users for online interactive meeting. The total number of users and the total number of groups, and maximum number of the users per groups of the WCUWE of the CCDSVM can support is an implementation issue and depends on the capacity of the control system 2. The WCUWE of CCDSVM and the CCDSVM has been designed with unlimited scalability for both users and provisioned systems 3. On the other hand, the spirit of this invention does not limit to with the boundary issues of the WCUWE and the CCDSVM.

FIG. 8A and FIG. 8B illustrate that each user X and user Y has a different private work space 18 than others, and each has assigned with different system resources. Without joining any group or participating any group meeting, the console support software 6 of the control system 2 also can provide user X and user Y to peer-to-peer instantly posting files or folders one a time to each other, or instantly un-post the previous posted files and folders through similar steps as posting or un-posting materials in group online meeting model:

1) Let each user select, via mouse clicking, a source of file or folder for post or un-post;
2) Let the user to select a post operation (task) if the user want to post any file or folder through an operation menu; or to select an un-post operation (task) from an operation menu if said user like to un-post a previously posted file or folder;
3) upon submitting the operation (task), let each user provide input to a prompt of "who is a targeted user?" which provided by said console support software 9, and further submit the selected task;
4) Said console support software 6 obtains and parses the task information of original user, source of the file or folder, type of operation, and other information;
5) If said type of the operation is post file or folder, said console support software 6 deposits the information of said source file or folder to said private file and folder area 22 of said private work space 16 of a targeted user. If said operation type is un-post a file or folder, said console support software 6 searches a corresponding file or folder information from said private file and folder area 22 of said private work space 16 of said targeted user to match the source file or folder, if found a match, the corresponding entry of the file or folder is removed from said private file and folder area 22 of said private work space 16 of the targeted user; and
6) Upon each user refreshing the web-page in own web-browser 9, the console support software 6 retrieves and converts the updated information in said private file and folder area 22 of own private work space 16 of the user into a presentable web-format (web-page) and transmits said web-page to the web-browser 9 of the user for displaying and viewing.

For example, as shown in FIG. 8A, the user X can follow said steps 1) to 3) to post his "folder 2" 32, in the displayed files and folders area 22 of private working space 16 in the user X's web-browser 9, to the user Y. As shown in FIG. 8C, upon the user Y refreshing his/her web-browser 9 on a system by walking on a corresponding system node or folder node in the displayed tree, the user Y will see the "folder 2" 32 in his/her displayed private file and folder tree of displayed private work space of user Y shown in FIG. 8C. As matter of the fact, when walking a system node and/or a file & folder tree in said web-browser 9, a refreshing web-page screen request is generated and to be handled as described previously.

In addition to post or un-posting messages in the group based communication involving parties with two or more users, the WCUWE of the CCDSVM also provides each user to post message to each other user with non-group based 1-to-1 message model. FIG. 7A and FIG. 7B have shown an example of a user X and a user Y, who may not be in a same user group, however, the console support software 6 of the control system 2 provides each user to share and exchange messages with each other from a three-section web-page in said browser 9.

The section-3 of the web page in said browser 9 let user to work with same said steps of non-group based 1-to-1 posting files and folders or un-posting the previously posted files or folders as described in prior paragraphs—The section-3 included in FIGS. 7A and 7B just for a demonstration of how flexible of this invention is to display information under private work space of each user. Further, the number of sections in the screen layout and the order of each section in web-page display really is not a limitation to this invention.

The section-1 is a user message input area together with an additional input field of "To who" due to unlike in group online meeting, the console support software 9 have no knowledge of who is the targeted user in this case. Thus, a user can posting a message with similar steps as previously discussed in prior paragraphs-of this invention. Nevertheless, unlike with group meeting messaging model, after obtaining and parsing information of the messages from each user, the console support software 6 of the control system 2 will deposit the message to both targeted user and the original sending user's message areas 21 of the private work space 16. Further, with same said steps of displaying messages in each user's browser as described in previous paragraphs, each user can view both own message and messages from peer user in section-2 of the browser 9.

For example, as shown in FIG. 7A, the user X input a message of "msg4 of user X" 30 and type "user Y" in input field of "To who", and then submit the message by clicking on "Send" button. Similar as shown in FIG. 7B, the user Y input a message of "Msg3 of user Y" 31, and type "user X" in input field of "To who", and then submit the message. Upon the refreshing the web-page in the web-browser 9 of each of the users, the user X will see the message 30 he/she sent and the message 31 from the user Y. Also the user Y will see both messages 30 and 31 at same time.

Again, the design choice of three sections of the web-page display and the order of each section is just a preferred example of implementation for non-group based peer user communication. This invention does not limited by web-screen display layout, for example, a screen display only with said section-1 and section-2 are also possible and so on without limitation.

The WCUWE of the CCDSVM has provided a security hierarchy for members of any team to work together cross multiple locations. With said security hierarchy and said steps of posting or un-posting file and folder, the console support software 6 of the control system 2 can specially let only a team leader with capability of posting folder or file to be viewed, shared, and accessed by all team members or by an individual member in a non-group meeting based environment. In addition, the console support software 6 also let each team member to post or un-post his/her file or folders to only a specific peer user one a time in non-group-meeting based environment. Again the said files or folders could be on said control system 2 or on any said provisioned system 3.

It is relatively straightforward for the WCUWE of the CCDSVM, more specifically the console support software 6, to support massive online users, who do not have account with the CCDSVM and can not login the CCDSVM, yet to view the dynamically posted files, folders, or messages posted by users with account of the CCDSVM.

In a preferred example, such as shown in FIG. 6E, the console support software 6 of the control system 2 provides a web-page to massive online users, who do not have to login the CCDSVM. The web-page could be layout with two major sections with section-1 to display messages in the sharable message area 18 in a designated user group's common work space 15 while the section-2 to display file or folders in the sharable file or folder area 19 in said designated user group's common work space 15.

Meanwhile, for users belong to same said designated user group, each user from a web-browser on any system across said network login to the CCDSVM and get said group online meeting web-page as shown in FIG. 6A for the user X and in FIG. 6B for the user Y. Further as described previous paragraph, each user in said group can instantly post message to said message area 18 of the designated user group's common work space 15, or post a file or folder to the sharable file and folder area 19 in the designated user group's common work space 15. Also, each user in the user group can instantly un-post the previously posted files or folders by removing the corresponding file or folder entry in the file and folder area 19 of the designated user-group's common work space 15, or un-post the previously posted messages by removing them from the common message area 18 of the common work space 15 of the user-group as described in previous several paragraph-.

Meanwhile as previously described and as shown in FIG. 6E, said web-page in the browser 9 is for access by massive online users, who have no account with the CCDSVM. The web page can be dynamically updated, displayed, and further be viewed by the massive users anywhere through their own browser 9 accordingly with the same pace as dynamically display of said section-2 and section-3 of a web-page in the browser 9 as shown in FIG. 6A and FIG. 6B. Again, the two sections of a web-page display layout is a preferred example and it does not limit this invention because with this invention other layout is also possible, for example, it may be desired to have web-page layout only contains one section, which is either for messages or file or folder's display depending on the application's need.

As shown in FIG. 8A, FIG. 8B, and FIG. 8C, with non-group based peer-to-peer post or un-post files and folders, people may often do not remember how many files and folders have been posted for sharing. For example, as shown in FIG. 8A, the user X can select "folder 2" 32, select a post on operation menu, and provide target "user Y" to share "folder 2" 32. As show in FIG. 8C, the user Y can see "Folder 2" 32 of the user X in the web-browser 9 of the user Y after the user X post "Folder 2" 32. If the user X selects various files or folders for sharing with other dozen people, the user X will have difficult time to remember what has been shared and who are targeted users shared with. As shown in FIG. 11, the console support software 6 of the control system 2 can provide each user, user X for example, a sharing control list for displaying of how many files or folders being posted by him or her and shared to whom.

As shown in FIG. 11 of the personal share management list in the user X's web-browser 9, an entry of posted "Folder 2" 32 is listed at bottom of said control list and it is posted/shared to the user Y. Further, said console support software 6 can provide each user to selectively un-post the previously posted files and folders via clicking on a "delete shared?" option of an operation menu for corresponding entries in the control list to generate an un-post operation task. For example, the user X clicks on "delete share?" to un-post the "Folder 2" 32. Thereafter, as described before said console support software 6 of the control system 2 will execute the un-post task. Further upon refreshing the targeted user Y's web-page in said web-browser 9, in stead of seeing "Folder 2" 32 as shown in FIG. 8C, the user Y will see an updated view of said web-page as shown in FIG. 8B, where the "Folder 2" 32 has been removed. The operation menu for "delete share?" depicted here just for example and it could be displayed in any other form.

In addition to let original user in a group to control the un-posting file or folder in a group based communication, the console support software 6 of the control system 2 may also provide a privileged user to un-post the previously posted files or folders in the displayed file and folder section-3 of said web-page. To support this capability, the console support software 6 will provide an operation menu to associate with said displayed files and folders in said display section-3, further to allow privileged user to perform similar un-post operation. After receiving the un-post operation, the console support software 6 will perform similar searching for selected file or folder in the group file and folder area 19 of the group common work space 15 of said group, if there is match, the corresponding entry will be deleted. Also, the file and folder section of the web-page in the web-browser 9 can be refreshed accordingly as described before.

Figure 12:
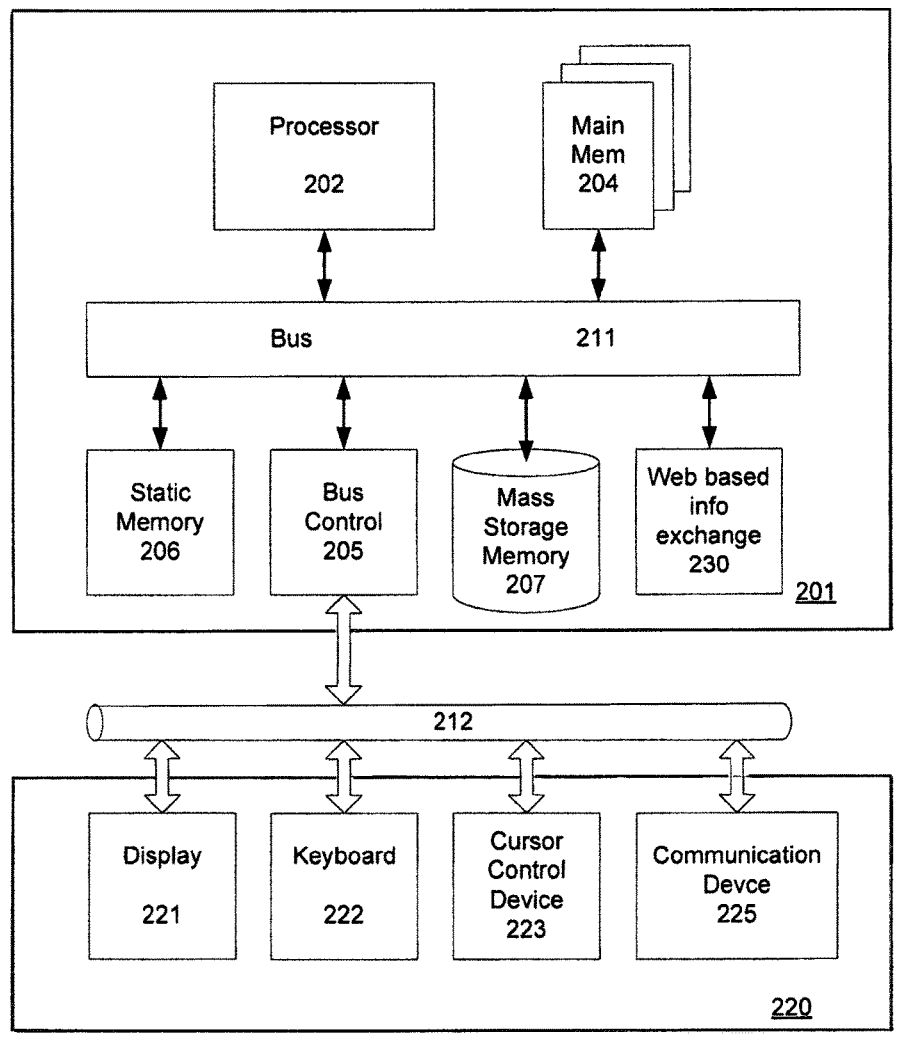
FIG. 12 illustrates an embodiment of a computing system of present invention.

Having briefly described embodiments of the web based network environment in which the present invention operates, FIG. 12 illustrates an example of a computer system 1200, which is an exemplary client system 10, provisioned system 3, control system 2, or console system 1 in which the features of the present invention may be implemented. Process of the web based information exchange can be implemented in any processor-based computer system, such as a PC, a workstation, or a mainframe computer. It will be apparent to those of ordinary skill in the art that other alternative computer system architectures may also be employed.

Referring back to FIG. 12, computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a web information exchange module 230. Bus 211 is used to transmit information between various components and processor 202 for data processing. Processor 202 may be any of a wide variety of general-purpose processors or microprocessors such as Pentium™ microprocessor, Motorola™68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Web based information exchange 230, in one embodiment, is a network control component for facilitating information exchange over the Web. It should be noted that web based information exchange 230 could be software or hardware or a combination of software and hardware components.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221 projects or displays images of a graphical planning board. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server or other computers, through wide-area network. Communication device 225 may include a modem or a network interface device, or other similar devices that facilitate communication between computer 200 and the network. Computer system 200 may be coupled to a number of servers via a network infrastructure such as the infrastructure illustrated in FIG. 1.

The present invention has been described in considerable details with reference to certain examples. However, other versions and examples are also possible, therefore, the spirit of this invention shall not be limited to these examples and/or embodiments. Also, the claims of this invention will label with numbering and in most cases, the numbering does not represent any sequence or order unless specifically described as the steps of a method.

What is claimed is:

1. A method implemented by a server to control access to one or more groups of computing systems in a network infrastructure, comprising:
    allocating a storage space for the server to control permitting or denying one or more users access to the one or more groups ("pools") of computing systems, where each pool comprises a plurality of computing systems among said computing systems spanned across the network infrastructure;
    causing to display the one or more pools of the computing systems on a first user device of a first user;
    parsing a request received from the first user device for instantly permitting or denying a second user to access a first pool, among the one or more pools, in response to the first user on the first user device selecting the first pool from the displayed one or more pools to submit the request;
    permitting said access according to said parsing, including:
        storing information of the first pool into the storage space, and
        presenting the stored information of the first pool on a second user device of the second user for the second user through the first pool displayed accessing the one or more computing systems in the first pool; and
    denying said access according to said parsing, including:
        searching information of a pool stored in the storage space, for finding a match with the first pool,
        deleting the information of the pool from the storage space when finding the match, and
        causing to delete the displayed first pool from the second user device.

2. The method of claim 1, wherein said each of the one or more pools further is represented by an information list which is automatically constructed through a pooling process across said network infrastructure of a corporate Intranet, the Internet, local area network, or wide area network.

3. The method of claim 1, wherein said allocating a storage space further comprises:
    assigning the storage space as a workspace to the second user for the second user privately accessing information, including to access the information of the first pool, stored in the workspace.

4. The method of claim 1, wherein said allocating a storage space further comprises:
    assigning the storage space as a workspace to a user group for members including the second user, in the user group accessing information, including to access the information of the first pool stored in the workspace.

5. The method of claim 1, wherein said parsing a request comprises:
    determining information related to the request, including to determining original user, target user, operation type, timestamp, and permission in respect to the allocated storage space, wherein the operation type at least is one of permitting or denying of accessing a group of computing systems, a computing system, a storage device, a storage space, a video, a file, or a folder.

6. The method of claim 2, wherein said displaying information of the first pool comprises:

displaying the information of the first pool as a navigable list for facilitating said access, wherein said displaying includes displaying of at least a graphic indicator and name for the first pool and for each of the one or more computing systems in the first pool.

7. A server comprising:

at least one hardware processor; and a non-transitory computer-readable medium comprising program instructions which, when executed by the at least one hardware processor, cause the server to control accessing one or more pools of computing systems in a network infrastructure that includes:

allocating a first storage space to control permitting or denying one or more users accessing the one or more groups ("pools") of computing systems, wherein each pool comprises a plurality of computing systems among said computing systems spanned across the network infrastructure;

presenting the one or more pools of computing systems on a first user device of a first user;

parsing a request received from the first user device for instantly permitting or denying a second user accessing a first pool among the one or more pools in response to the first user on the first user device selecting the first pool from the one or more pools displayed to submit the request;

permitting said access according to said parsing, including:

storing information of the first pool into the first storage space, and presenting the stored information of the first pool on a second user device of the second user for the second user through the first pool displayed accessing the one or more computing systems in the first pool; and denying said access according to said parsing, including:

searching information of a pool stored in the storage space for finding a matching with the first pool, deleting the information of the pool from the storage space when finding the matching, and causing to delete the displayed first pool from the second user device.

8. The server of claim 7, wherein said program instructions causing the server to permit said access according to said parsing further comprises:

permitting to access an application service operatively delivering by at least one of the computing systems in the first pool independent of the server.

9. The server of claim 7, wherein said program instructions causing the server to permit said access according to said parsing further comprises:

permitting to transferring a file or folder between two computing systems among said computer systems independent of the server.

10. The server of claim 7, wherein said program instructions causing the server to permit said access according to said parsing further comprises:

permitting to configure storages distributed among the computing systems in the first pool independent of the server.

11. The server of claim 7, wherein said program instructions causing the server to permit said access according to said parsing further comprises: permitting to displaying and monitoring status of network, storage, hardware processor, and processes/threads for each computing system in the first pool across said network infrastructure independent of the server.

12. The server of claim 7, wherein each of the one or more pools of the computing systems further is represented by an information list that is automatically constructed through a pooling process across said network infrastructure of a corporate Intranet, the Internet, local area network, or wide area network.

13. The server of claim 12, wherein said displaying information of the first pool further comprises:

displaying the information of the first pool as a navigable list for facilitating said access that includes displaying at least one graphic indicator and name for the first pool and for each of the one or more computing systems in the first pool.

14. The server of claim 7, wherein the first storage space is further allocated by the server to the second user for the second user privately access the information, including the information of the first pool stored in the first storage space.

15. The server of claim 7, wherein the first storage space is further allocated by the server to a user group for members, including the second user, in the user group accessing information, including the information of the first pool stored in the first storage space.

16. The server of claim 7, wherein the program instructions further configure the server to allocate a second storage space to control instant permitting or denying one or more users for accessing a second one of the one or more pools of the computing systems.

17. The server of claim 16, wherein each of the first and second storage spaces is configured in storage media and comprises a plurality of sections, including a network information sections, wherein the information for each of the first and second pools is stored in the corresponding network information section of the each of the first and second storage spaces.

18. The server of claim 7, wherein each of said one or more pools of computing systems further is one of storage service pool file service pool web service pool video service pool or security monitoring service pool.

* * * * *